(12) United States Patent
Dobrawa et al.

(10) Patent No.: US 8,759,274 B2
(45) Date of Patent: Jun. 24, 2014

(54) SELF-EMULSIFIABLE POLYOLEFINE COMPOSITIONS

(71) Applicant: BASF SE, Ludwigshafen (DE)

(72) Inventors: Rainer Dobrawa, Stuttgart (DE); Dieter Boeckh, Limburgerhof (DE); Rajan K. Panandiker, West Chester, OH (US); Julie Menkhaus, Cleves, OH (US); Frank Huelskoetter, Bad Dürkheim (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/672,197

(22) Filed: Nov. 8, 2012

(65) Prior Publication Data

US 2013/0123160 A1 May 16, 2013

Related U.S. Application Data

(60) Provisional application No. 61/558,478, filed on Nov. 11, 2011, provisional application No. 61/558,678, filed on Nov. 11, 2011.

(51) Int. Cl.
| | |
|---|---|
| *C11D 3/18* | (2006.01) |
| *C11D 1/00* | (2006.01) |
| *C11D 3/37* | (2006.01) |
| *B08B 3/04* | (2006.01) |

(52) U.S. Cl.
USPC ........... 510/342; 510/276; 510/353; 510/417; 510/437; 510/475; 510/505; 8/137; 134/25.2; 134/25.3; 134/39; 134/42

(58) Field of Classification Search
USPC ......... 510/276, 342, 353, 417, 437, 475, 505; 8/137; 134/25.2, 25.3, 39, 42
See application file for complete search history.

(56) References Cited

U.S. PATENT DOCUMENTS

| | | | |
|---|---|---|---|
| 5,420,207 A | 5/1995 | Greif et al. | |
| 5,486,303 A | 1/1996 | Capeci et al. | |
| 5,489,392 A | 2/1996 | Capeci et al. | |
| 5,516,448 A | 5/1996 | Capeci et al. | |
| 5,565,422 A | 10/1996 | Del Greco et al. | |
| 5,569,645 A | 10/1996 | Dinniwell et al. | |
| 5,574,005 A | 11/1996 | Welch et al. | |
| 5,691,297 A | 11/1997 | Nassano et al. | |
| 5,879,584 A | 3/1999 | Bianchetti et al. | |
| 5,883,196 A | 3/1999 | Rath et al. | |
| 5,962,604 A | 10/1999 | Rath | |
| 7,629,415 B2 | 12/2009 | Sandner et al. | |
| 2003/0191257 A1 | 10/2003 | Wettling et al. | |
| 2004/0154216 A1 | 8/2004 | Huffer et al. | |
| 2008/0221257 A1 | 9/2008 | Becker et al. | |
| 2008/0250701 A1* | 10/2008 | Van De Berg et al. | 44/301 |
| 2008/0274073 A1 | 11/2008 | Bell et al. | |
| 2011/0281782 A1 | 11/2011 | Panandiker et al. | |

FOREIGN PATENT DOCUMENTS

| | | |
|---|---|---|
| DE | 4319671 A1 | 12/1994 |
| DE | 4319672 A1 | 12/1994 |
| DE | 19519042 A1 | 11/1996 |
| DE | 102004031550 A1 | 2/2006 |
| FR | 2911497 A1 | 7/2008 |
| WO | WO-96/40808 A1 | 12/1996 |
| WO | WO-0206359 A1 | 1/2002 |
| WO | WO-2007/014915 A1 | 2/2007 |
| WO | WO-2007042454 A1 | 4/2007 |
| WO | WO-2007132971 A1 | 11/2007 |
| WO | WO-2011141496 A1 | 11/2011 |

OTHER PUBLICATIONS

International Search Report for PCT/EP2012/072162 dated Mar. 20, 2013.
U.S. Appl. No. 13/673,154.
U.S. Appl. No. 61/558,678.
U.S. Appl. No. 61/558,473.
U.S. Appl. No. 61/333,786.
U.S. Appl. No. 61/333,805.
European Search Report EP 11 18 8769, Apr. 13, 2012.

* cited by examiner

*Primary Examiner* — Brian P Mruk
(74) *Attorney, Agent, or Firm* — Drinker Biddle & Reath LLP

(57) ABSTRACT

The present invention is directed to self-emulsifiable compositions comprising polyolefines, in particular polyisobutene, the process to obtain said emulsions and the use of said emulsions.

14 Claims, No Drawings

SELF-EMULSIFIABLE POLYOLEFINE COMPOSITIONS

CROSS-REFERENCE TO RELATED APPLICATIONS

This application claims the benefit of U.S. Provisional Application No. 61/558,478, filed Nov. 11, 2011, and U.S. Provisional Application No. 61/558,678, filed Nov. 11, 2011, both of which are incorporated herein by reference.

The present invention is directed to self-emulsifiable polyolefine compositions, in particular to self-emulsifiable polyisobutene compositions and the use of said emulsions.

Polyolefines and in particular polyisobutene(s) are useful ingredients in a lot of technical applications and contribute to improve the feel properties when applied on surfaces such as hair or textile. The formulation of polyisobutene mostly consists in firstly emulsify the polyisobutene in an oil-in-water emulsion and then incorporate the emulsion in an aqueous formulation such as a hair care or laundry formulation, in order to obtain benefits such as emollience, hydrophobization, lubrication or adhesion. Polyisobutene emulsions are exemplified in PCT/EP2011/057586, which has not yet been published and which discloses an emulsion comprising (a) polyolefines such as polyisobutene, in an amount of from 2 to 75 weight %, (b) polymers Px which are copolymers of non ionic, anionic or pseudocationic monomers in an amount of from 0.05 to 40 weight % and (c) water in an amount of from 10 to 97.95 weight %.

WO 2007/042454 A1 describes the use of terpolymers of (a) maleic anhydride, (b) isobutylene and (c) polyisobutylene for producing aqueous emulsions or dispersions of hydrophobic substances such as silicones.

WO 2007/014915 writes on aqueous dispersions comprising (A) a polymer such as polyisobutene and (B) an emulsifier obtained by the polymerization of isobutylene, maleic anhydride and polyethyleneglycol. This dispersion is used for the treatment of leather or as additive in construction chemicals.

WO2004/154216 describes a copolymer containing polyisobutene, maleic anhydride and polyalkylene glycols. These copolymers are used as emulsifiers for the preparation of oil-in-water emulsions and find applications e.g. in washing and cleaning formulations, in the cosmetics or pharmaceutical sector.

Nevertheless, the preparation of an emulsion as a formulation ingredient has a number of drawbacks. Firstly, emulsions have to be prepared at high shear rate stirring, which is a complex process in the production scale and involve a high energy input. Secondly, unlike microemulsions, emulsions are not thermodynamically stable, and can segregate by creaming/sedimentation, aggregation and coalescence (phase separation). Creaming is observed when emulsion droplets have a density lower than that of the continuous phase. Such droplets have the tendency to gather on top of the liquid level to form a layer enriched with emulsion droplets. In contrast, droplets having a density higher than that of the continuous phase have the tendency to sink down to the bottom of the liquid, forming a layer enriched with emulsion droplets. This effect is called sedimentation. Whereas creaming and sedimentation are reversible processes, coalescence is an irreversible effect where individual emulsion droplets merge until, in the end, two continuous phases are formed. Creaming, sedimentation and coalescence have to be avoided, at least during the time between production of the emulsion and the introduction of the emulsion in the intended formulation. To guarantee the stability of the emulsion until its application, measures like temperature control—avoiding too high as well as too low temperatures—or the shipment in stirred containers are needed, which adds to complexity in the supply chain as well as to shipping costs.

Besides, the incorporation of an emulsion, which already contains a large amount of water, in an aqueous formulation such as a hair care or laundry formulation reduces the flexibility of the formulator as to the choice of ingredients and the total concentration of the final formulation.

The problem to be solved is to identify a polyolefin composition that has a water content as low as possible or, even better, is completely free of water and that can be emulsified in aqueous formulations and/or water without the need for a high shear emulsification or any other standard emulsification process. Ideally, the composition should be able to self-emulsify only by stirring it into water or an aqueous formulation.

This goal is surprisingly reached by the composition according to claims 1 to 12. The use of such a composition according to claim 13 forms an additional aspect of the present invention.

For the purpose of this invention the prefix (meth) written before a compound means the respective unsubstituted compound and/or the compound substituted by the methyl group. For instance, "(meth)acrylic acid" means acrylic acid and/or methacrylic acid, (meth)acrylate means acrylate and/or methacrylate, (meth)acrylamide means acrylamide and/or methacrylamide.

Thus the present invention is directed to a self-emulsifiable composition containing
a) polyolefine(s) in an amount of from 5 to 90 weight %,
b) polymeric emulsifier(s) $P_x$ in an amount of from 5 to 90 weight %,
c) oil(s) $O_x$ in an amount of from 0 to 40 weight %,
d) surfactant(s) $S_x$ in an amount of from 0 to 40 weight %,
e) additive(s) $A_x$ in an amount of from 0 to 10 weight %,
f) water in an amount of from 0 to 8 weight %,
based on the total weight of the composition,
wherein water is not the continuous phase of the composition,
wherein the weight ratio of polyolefine(s) to $P_x$ and $S_x$ is in the range of from 4:1 to 1:3 and the
weight ratio of $P_x$ to $S_x$ is higher than 1.25.

The self-emulsifiable composition can consist of components a) and b), in which case the amounts add up to 100 weight %, —such a composition forms a preferred embodiment of the present invention. The composition can also contain components a) and b) as well as additional components. Compositions, which in addition to components a) and b) also contain components c) and/or d) and/or e) form one preferred embodiment of the invention. The inventive composition may also contain other components.

With regard to the amounts, in which the respective compounds are present in the self-emulsifiable composition, there exist preferred ranges. Thus a composition according to the invention, wherein the components of the self-emulsifiable composition independently of each other are present in amounts of:
a) polyolefine(s) in an amount of from 20 to 70 weight %,
b) polymer emulsifier(s) $P_x$ in an amount of from 10 to 50 weight %,
c) oil(s) $O_x$ in an amount of from 0 to 40 weight %,
d) surfactant(s) $S_x$ in an amount of from 0.1 to 30 weight %,
e) additive(s) $A_x$ in an amount of from 0 to 10 weight %,
f) water in an amount of from 0 to 8 weight %,
based on the total weight of the composition,
wherein water is not the continuous phase of the composition,
wherein the weight ratio of polyolefine(s) to $P_x$ and $S_x$ is in the range of from 4:1 to 1:3 and the weight ratio of $P_x$ to $S_x$ is higher than 1.25.

Even more preferred is a composition, wherein the components of the self-emulsifiable composition independently of each other are present in amounts of:
a) polyolefine(s) in an amount of from 30 to 60 weight %,
b) polymer emulsifier(s) $P_x$ in an amount of from 20 to 45 weight %,
c) oil(s) $O_x$ in an amount of from 0.1 to 30 weight %,
d) surfactant(s) $S_x$ in an amount of from 0.5 to 25 weight %,
e) additive(s) $A_x$ in an amount of from 0.1 to 10 weight %,
f) water in an amount of from 0 to 8 weight %,
based on the total weight of the composition,
wherein water is not the continuous phase of the composition,
wherein the weight ratio of polyolefine(s) to $P_x$ and $S_x$ is in the range from 4:1 to 1:3 and the weight ratio of $P_x$ to $S_x$ is higher than 1.25.

And most preferred is a composition, wherein the components of the self-emulsifiable composition independently of each other are present in amounts of:
a) polyolefine(s) in an amount of from 40 to 50 weight %,
b) polymeric emulsifier(s) $P_x$ in an amount of from 25 to 40 weight %,
c) oil(s) $O_x$ in an amount of from 5 to 15 weight %,
d) surfactant(s) $S_x$ in an amount of from 5 to 15 weight %,
e) additive(s) $A_x$ in an amount of from 2 to 8 weight %,
f) water in an amount of from 0 to 8 weight %,
based on the total weight of the composition
wherein water is not the continuous phase of the composition,
wherein the weight ratio of polyolefine(s) to $P_x$ and $S_x$ is in the range from 4:1 to 1:3 and the weight ratio of $P_x$ to $S_x$ is higher than 1.25.

To maximize the content of polyolefine(s), it is advantageous to reduce the amount of other components in the emulsion. Therefore, further preferred emulsions are those, which comprise:
a) polyolefine(s) in an amount of from 35 to 55 weight %,
b) polymeric emulsifier(s) $P_x$ in an amount of from 30 to 45 weight %,
c) oil(s) $O_x$ in an amount of 0.1 to 20 weight %,
d) surfactant(s) $S_x$ in an amount of from 5 to 12 weight %,
e) additive(s) $A_x$ in an amount of from 0 to 10 weight %,
based on the total weight of the composition,
wherein water is not the continuous phase of the composition,
wherein the weight ratio of polyolefine(s) to $P_x$ and $S_x$ is in the range from 4:1 to 1:3 and the weight ratio of $P_x$ to $S_x$ is higher than 1.25
a) polyolefine(s) in an amount of from 50 to 65 weight %,
b) polymer(s) $P_x$ in an amount of from 25 to 65 weight %,
c) oil(s) $O_x$ in an amount of 0 weight %,
d) surfactant(s) $S_x$ in an amount of from 5 to 12 weight %,
e) additive(s) $A_x$ in an amount of 0 weight %,
based on the total weight of the composition,
wherein water is not the continuous phase of the composition,
wherein the weight ratio of polyolefine(s) to $P_x$ and $S_x$ is in the range from 4:1 to 1:3 and the weight ratio of $P_x$ to $S_x$ is higher than 1.25
a) polyolefine(s) in an amount of from 5 to 20 weight %,
b) polymer(s) $P_x$ in an amount of from 70 to 90 weight %,
c) oil(s) $O_x$ in an amount of 0 to 15 weight %,
d) surfactant(s) $S_x$ in an amount of from 0 weight %,
e) additive(s) $A_x$ in an amount of 0.5 weight %,
based on the total weight of the composition,
wherein water is not the continuous phase of the composition,
wherein the weight ratio of polyolefine(s) to $P_x$ and $S_x$ is in the range from 4:1 to 1:3 and the weight ratio of $P_x$ to $S_x$ is higher than 1.25
or
a) polyolefine(s) in an amount of from 40 to 60 weight %,
b) polymer(s) $P_x$ in an amount of from 40 to 60 weight %,
c) oil(s) $O_x$ in an amount of from 0 to 5 weight %,
d) surfactant(s) $S_x$ in an amount of 0 weight %,
e) additive(s) $A_x$ in an amount of from 0 to 8 weight %,
based on the total weight of the composition,
wherein water is not the continuous phase of the composition,
wherein the weight ratio of polyolefine(s) to $P_x$ and $S_x$ is in the range from 4:1 to 1:3 and the weight ratio of $P_x$ to $S_x$ is higher than 1.25.

In order to test whether or not water is the continuous phase of the composition a conductivity measurement is used showing that the compositions have a low conductivity in the range of the pure polyolefine(s), oil(s) or surfactant(s), and not a high conductivity as water.

The composition according to the invention is self-emulsifiable, i.e. when mixed in an aqueous formulation, simple stirring is required for the composition to form an emulsion.

In one embodiment of the invention, the self-emulsifiable composition is a water-free composition. Water-free compositions are prepared without added water. Nevertheless, there might be minor amounts of residual water originating from the water content of the raw materials. Self-emulsifiable water-free compositions contain less than 2 weight % of water, preferably less than 1 weight % of water, even more preferably, less than 0.5 weight % of water.

In another embodiment of the invention, the self-emulsifiable composition is a water-reduced composition. Water-reduced compositions are prepared by adding a reduced amount of water, in order to reduce the viscosity of the self-emulsifiable composition, so that the total amount of water in the composition lies in the range of from 2 to 8 weight %, preferably from 2 to 6 weight %, even more preferably from 2 to 5 weight %.

Not only the amount but also the nature of the components of the inventive composition can be chosen advantageously:

In general polyolefine(s) as used in the present invention is/are a chemical compound(s) consisting of carbon and hydrogen atoms. The polyolefine(s) can be linear, e.g. polyethylene, or can have side chains, e.g. polypropylene having methyl-side chains, which side chains may be that long that comb-like structures are found, or can be co- or ter-polymers, e.g. ethene/propene-copolymer or ethane/propene/hexane-terpolymer. It is particularly preferred, when the polyolefine(s) is/are substantially homopolymers, i.e. the degree of co- or ter-monomer is below 10 mass %, preferably below 5 mass % based on the mass of the polymer. It is particularly preferred, if the polymer(s) is/are homopolymers, i.e. they consist of only one kind of monomer.

In particular a composition, wherein the polyolefin(s) a) is/are selected from the group consisting of: polyethylene, polypropylene, polybutylene and polyisobutylene is preferred. The composition can comprise one or more polyolefine. An emulsion, which only comprises one polyolefine a) is preferred. A composition, which only comprises polyisobutylene as polyolefine a) is particularly preferred. The polyolefines a) can be prepared by the usual procedures (Ullmann's Encyclopedia of Industrial Chemistry, Polyolefins, Whiteley, Heggs, Koch, Mawer, Immel, Wiley-VCH Verlag GmbH & Co. KGaA, Weinheim 2005). The production of polyisobutylene is described e.g. in WO 02/06359 and WO 96/40808 in even more detail. The polyolefine(s) a) preferably has/have of molar mass (Mn) of at least 250 g/mol, preferably at least 350 g/mol and more preferred at least 500 g/mol. The polyolefin(s) a) have a maximum molar mass Mn of 10.000 g/mol, preferably 5000 g/mol and more preferred of 2500 g/mol. The most preferred range of the molar mass Mn of polyolefins a) is from 550 to 2000 g/mol.

Also the self-emulsifiable composition according to the invention comprises polymeric emulsifier(s) $P_x$, wherein $P_x$ is/are selected from the group consisting of $P_1$) polyisobutene derivatives, wherein $P_1$ is polyisobutenamine, polyisobutene succinic anhydride, a copolymer of polyisobuten succinic anhydride with polyalkylene glycol, a copolymer of polyisobuten succinic anhydride with an oligoamine or with an oligoamine alkoxylate.

Polyisobutylene succinic acid is prepared by en-reaction of succinic anhydride and polyisobutylene, as described in DE-A 19519042, DE-A 4319671, DE-A 4319672 or H. Mach and P. Rath in "Lubrication Science II (1999), S. 175-185. The preparation of polyisobutene and polyisobutene amine is described in EP244616 and references cited therein. Copolymers of polyisobutene succinic anhydride with polyalkylene glycol are described in WO2007/014915. Copolymers of succinic anhydride with oligoamine or with an oligoamine alkoxylate are described in PCT/EP2011/057586. For all polyisobutylene derivatives, the polyisobutylene part has a molar mass ($M_n$) of at least 250 g/mol, preferably at least 350 g/mol and more preferred at least 500 g/mol, and a maximum molar mass $M_n$ of 10.000 g/mol, preferably 5000 g/mol and more preferred of 2500 g/mol. The most preferred range of the molar mass $M_n$ of the polyisobutylene part is from 550 to 2000 g/mol.

Polymer P1 is preferably selected from the group consisting of polyisobutene derivatives, wherein $P_1$ is polyisobutenamine, polyisobutene succinic anhydride, a copolymer of polyisobuten succinic anhydride and polyethylene glycol.

$P_2$) polymeric cationic emulsifiers, wherein $P_2$ is the result of the polymerization of $A_2$) one or more cationic ethylenically unsaturated monomers (monomer A2)

$B_2$) one or more linear or branched alkyl(meth)acrylates (monomer B2), $C_2$) from 0 to 30 weight % of one or more $C_3$-$C_8$ monoethylenically unsaturated carboxylic acids (monomer C2), Monomer A2 is a cationic monoethylenically unsaturated monomer which is at least partially soluble in water of the reaction solvent, or in the other monomers if no water or solvent is used. Suitable examples of monomer A are (3-acrylamidopropyl)-trimethylammonium chloride (APTAC), (3-methacrylamidopropyl)-trimethylammonium chloride (MAPTAC), dimethylaminopropylacrylat methochlorid, dimethylaminopropylmethacrylat methochlorid, diallyl dimethyl ammonium chloride (DADMAC). Monomer A is preferably DADMAC.

Monomer B2 is a linear or branched alkyl(meth)acrylate, preferably a C10-C30 alkyl(meth)acrylate, even more preferably a C12-C20 alkyl(meth)acrylate. Suitable monomers B include linear and branched alkyl esters of (meth)acrylic acid, such as octyl acrylate, dodecyl acrylate, lauryl acrylate, cetyl acrylate, octadecyl acrylate, isodecyl acrylate, 2-ethylhexyl acrylate. Monomer B is preferably lauryl acrylate (LA).

Monomer C2 is a $C_3$-$C_8$ monoethylenically unsaturated carboxylic acid. Suitable examples of monomer C include acrylic acid, methacrylic acid, crotonic acid, maleic acid, maleic anyhydride, fumaric acid, itaconic acid and alkyli and metal salts thereof. Monomer C is preferably acrylic acid (AA).

With regard to the amounts in which the respective monomers are present in the polymer $P_2$, there are preferred ranges. Thus the polymer $P_x$ is preferably the product of the polymerization of A2) from 60 to 95 weight % of monomer A2,
B2) from 5 to 45 weight % of monomer B2,
C2) from 0 to 30 weight % of monomer C2.

Even more preferred is a polymer $P_2$ which is the product of the polymerization of:
A2) from 70 to 90 weight % of monomer A2,
B2) from 10 to 35 weight % of monomer B2,
C2) from 5 to 20 weight % of monomer C2.

Another preferred embodiment is a polymer $P_2$ which is the product of the polymerization of:
A2) from 70 to 90 weight % of monomer A2,
B2) from 10 to 35 weight % of monomer B2,
C2) 0 weight % of monomer C2.

Most preferably, polymer $P_2$) is a polymeric cationic emulsifier, wherein $P_2$ is the result of the polymerization of
A2) diallyl dimethyl ammonium chloride,
B2) one or more linear or branched alkyl(meth)acrylates,
C2) from 0 to 30 weight % of acrylic acid.

$P_3$) being copolymers of polyalkylene(s) of formula 3

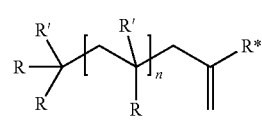

3 wherein:
$R^*$=H, $CH_3$,
R=H, methyl,
R'=H, methyl,
n=1 to 200,
with monoethylenically unsaturated monomers.

With regard to copolymers of polyalkylene(s) of formula 3, there exist preferred embodiments. Thus, the polyalkylene(s) of formula 3 is preferrably composed of:
$R^*$=R=R'=$CH_3$,
n=1 to 200

In another embodiment of the invention, polyalkylene(s) of formula 3 is preferably composed of:
$R^*$=R=R'=H
n=1 to 200

The composition can comprise one or more polymers of one or more of the groups $P_1$), $P_2$) and $P_3$). If two or more polymers of one group and/or of different groups are present, they can be present in equal amounts or in different amounts.

A self-emulsifiable composition, wherein the oil(s) $O_x$ is/are selected from the group consisting of:
c1) mineral oils, having a boiling point at atmospheric pressure of 150° C. or higher
c2) esters of $C_{10}$- to $C_{26}$-carboxylic acid with $C_8$-$C_{24}$-alcohols and
c3) silicone oils forms a preferred embodiment of the present invention.

Preferred oil(s) $O_x$ are mineral oils available under the names mineral oil light, mineral oil heavy, paraffin liquid or Nujol, that are liquid at room temperature. One example is mineral oil available from Sigma-Aldrich Chemie GmbH, Munich, under the order number 69808.

Particularly preferred oils are silicone oils. Preferred silicone contents are less that 5 weight %, preferably less than 3 weight %, even more preferably less than 1 weight %. Suitable silicone oils are, for example, linear polydimethylsiloxanes, poly(methylphenylsiloxanes), cyclic siloxanes, polyethersiloxanes, dimethicone copolyols (CTFA) and amino-functional silicone compounds such as amodimethicones (CTFA) and mixtures thereof. The number-average molecular weight of the polylsiloxanes is preferably in a range from about 1000 to 150 000 g/mol.

A self-emulsifiable composition, wherein the surfactant(s) $S_X$ is/are selected from the group consisting of:
d1) nonionic surfactants,
d2) anionic surfactants and
d3) cationic surfactants is preferred.

Surfactants normally consist of a hydrophobic and a hydrophilic part. Thereby the hydrophobic part normally has a chain length of 4 to 20 C-atoms, preferably 6 to 19 C-atoms and particularly preferred 8 to 18 C-atoms. The functional unit of the hydrophobic group is generally an OH— group, whereby the alcohol can be linear or branched. The hydrophilic part generally consists substantially of alkoxylated units (e.g. ethylene oxide (EO), propylene oxide (PO) and/or butylene oxide (BO), whereby generally 2 to 30, preferably 5 to 20 of these alkoxylated units are annealed, and/or charged units such as sulfate, sulfonate, phosphate, carbonic acids, ammonium and ammonium oxide.

Examples of anionic surfactants are: carboxylates, sulfonates, sulfo fatty acid methylesters, sulfates, phosphates. Examples for cationic surfactants are: quartery ammonium compounds. Examples for betaine-surfactants are: alkyl betaines. Examples for non-ionic compounds are: alcohol alkoxylates.

A "carboxylate" is a compound, which comprises at least one carboxylate-group in the molecule. Examples of carboxylates, which can be used according to the present invention, are
soaps—e.g. stearates, oleates, cocoates of alkali metals or of ammonium,
ethercarboxylates—e.g. Akypo® RO 20, Akypo® RO 50, Akypo® RO 90.

A "sulfonate" is a compound, which comprises at least one sulfonate-group in the molecule. Examples of sulfonates, which can be used according to the invention, are
alkyl benzene sulfonates—e.g. Lutensit® A-LBS, Lutensit® A-LBN, Lutensit® A-LBA, Marlon® AS3, Maranil® DBS,
alkyl sulfonates—e.g. Alscoap OS-14P, BIO-TERGE® AS-40, BIO-TERGE® AS-40 CG, BIO-TERGE® AS-90 Beads, Calimulse® AOS-20, Calimulse® AOS-40, Calsoft® AOS-40, Colonial® AOS-40, Elfan® OS 46, Ifrapon® AOS 38, Ifrapon® AOS 38 P, Jeenate® AOS-40, Nikkol® OS-14, Norfox® ALPHA XL, POLYSTEP® A-18, Rhodacal® A-246L, Rhodacal® LSS-40/A,
sulfonated oils such as Turkish red oil,
olefine sulfonates,
aromatic sulfonates—e.g. Nekal® BX, Dowfax® 2A1.

A "sulfo fatty acid methylester" is a compound, having the following general formula (I):

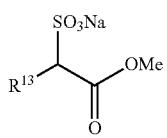

(I)

wherein $R^{13}$ has 10 to 20 C-atoms; preferably 12 to 18 and particularly preferred 14 to 16 C-atoms.

A "sulfate" is a compound, which comprises at least one $SO_4$-group in the molecule. Examples of sulfates, which can be used according to the present invention, are
fatty acid alcohol sulfates such as coco fatty alcohol sulfate (CAS 97375-27-4)—e.g. EMAL® 10G, Dispersogen® SI, Elfan® 280, Mackol® 100N,
other alcohol sulfates—e.g. Emal® 71, Lanette® E,
coco fatty alcohol ethersulfates—e.g. Emal® 20C, Latemul® E150, Sulfochem® ES-7, Texapon® ASV-70 Spec., Agnique SLES-229-F, Octosol 828, POLYSTEP® B-23, Unipol® 125-E, 130-E, Unipol® ES-40,
other alcohol ethersulfates—e.g. Avanel® S-150, Avanel® S 150 CG, Avanel® S 150 CG N, Witcolate® D51-51, Witcolate® D51-53.

A "phosphate" is a compound, which comprises at least one $PO_4$-group. Examples of phosphates, which can be used according to the present invention, are
alkyl ether phosphates—e.g. Maphos® 37P, Maphos® 54P, Maphos® 37T, Maphos® 210T and Maphos® 210P,
phosphates such as Lutensit A-EP,
alkyl phosphates.

When producing the chemical composition of the present invention the anionic surfactants are preferably added as salts. Acceptable salts are e.g. alkali metal salts, such as sodium-, potassium- and lithium salts, and ammonium salts, such as hydroxyl ethylammonium-, di(hydroxyethyl)ammonium- and tri(hydroxyethyl)ammonium salts.

One group of the cationic surfactants are the quarternary ammonium compounds.

A "quarternary ammonium compound" is a compound, which comprises at least one $R_4N^+$-group per molecule. Examples of counter ions, which are useful in the quarternary ammonium cornpounds, are
halogens, methosulfates, sulfates and carbonates of coco fat-, sebaceous fat- or cetyl/oleyltrimethylammonium.
Particularly suitable cationic surfactants are:
N,N-dimethyl-N-(hydroxy-$C_7$-$C_{25}$-alkyl)ammonium salts;
mono- and di-($C_7$-$C_{25}$-alkyl)dimethylammonium compounds, which were quarternised with alkylating agents
esterquats, especially mono-, di- and trialkanolamines, quarternary esterified by $C_8$-$C_{22}$-carbonic acids;
imidazolinquats, especially 1-alkylimidazoliniumsalts of formula II or III

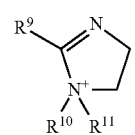

II

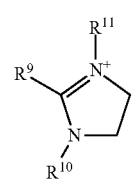

III wherein the variables have the following meaning:
$R^9$ $C_1$-$C_{25}$-alkyl or $C_2$-$C_{25}$-alkenyl;
$R^{10}$ $C_1$-$C_4$-alkyl or hydroxy-$C_1$-$C_4$-alkyl;
$R^{11}$ hydroxy-$C_1$-$C_4$-alkyl or a rest $R^1$—(CO)—X—$(CH_2)_m$— (X:—O— or —NH—; m: 2 or 3),
whereby at least one rest $R^9$ is $C_7$-$C_{22}$-alkyl.

A "betain-surfactant" is a compound, which comprises under conditions of use—i.e. in the case of textile washing under normal pressure and at temperatures of from room temperature to 95° C.—at least one positive charge and at least one negative charge. An "alkylbetain" is a betainsurfactant, which comprises at least one alkyl-unit per molecule. Examples of betainsurfactants, which can be used according to the invention, are Cocamidopropylbetain—e.g. MAFO® CAB, Amonyl® 380 BA, AMPHOSOL® CA, AMPHOSOL® CG, AMPHOSOL® CR, AMPHOSOL® HCG; AMPHOSOL® HCG-50, Chembetaine® C, Chembetaine® CGF, Chembetaine® CL, Dehyton® PK, Dehyton® PK 45, Emery® 6744, Empigen® BS/F, Empigen® BS/FA, Empigen® BS/P, Genagen® CAB, Lonzaine® C, Lonzaine® CO, Mirataine® BET-C-30, Mirataine® CB, Monateric® CAB, Naxaine® C, Naxaine® CO, Norfox® CAPB, Norfox® Coco Betaine, Ralufon® 414, TEGO®-Betain CKD, TEGOO Betain E KE 1, TEGO®-Betain F, TEGO®-Betain F 50 and aminoxides such as alkyl dimethyl amineoxide, i.e. compounds of general formula (IV)

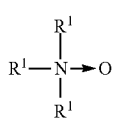

(IV)

whereby $R^1$ are different or identical and independently from each other selected from an aliphatic, cyclic or tertiary alkyl- or amido alkyl-moiety, e.g. Mazox® LDA, Genaminox®, Aromox® 14 DW 970.

Non-ionic surfactants are interfacially active substances having a head group, which is an uncharged, polar, hydrophilic group, not carrying an ionic charge at neutral pH, and which head group makes the non-ionic surfactant water soluble. Such a surfactant adsorbs at interfaces and aggregates to micelles above the critical micelle concentration (cmc). According to the type of the hydrophilic head group it can be distinguished between (oligo)oxyalkylene-groups, especially (oligo)oxyethylene-groups, (polyethyleneglycol-groups), including fatty alcohol polyglycol ether (fatty alcohol alkoxylates), alkylphenol polyglycolether and fatty acid ethoxylates, alkoxylated triglycerides and mixed ethers (polyethylene glycolether alkoxylated on both sides); and carbohydrate-groups, including e.g. alkyl polyglucosides and fatty acid-N-methylglucamides.

Alcohol alkoxylates, are based on a hydrophobic part having a chain length of 4 to 20 C-atoms, preferably 6 to 19 C-atoms and particularly preferred 8 to 18 C-atoms, whereby the alcohol can be linear or branched, and a hydrophilic part, which can be alkoxylated units, e.g. ethylene oxide (EO), propylene oxide (PO) and/or butylene oxide (BuO), having 2 to 30 repeating units. Examples are besides others Lutensol XP, Lutensol® XL, Lutensol® ON, Lutensol® AT, Lutensol® A, Lutensol® AO, Lutensol® TO.

Alcoholphenolalkoxylates are compounds according to general formula (V),

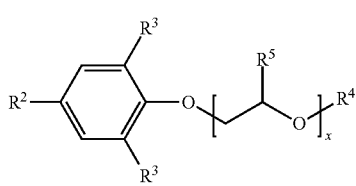

(V)

which can be produced by addition of alkylene oxide, preferably ethylene oxide onto alkyl phenols. $R^4$ is selected from $C_1$-$C_{10}$-alkyl and hydrogen, preferably $R^4$=H. It is also preferred, if $R^5$=H; in the same way it is preferred if $R^5$=$CH_3$, or, if $R^5$=$CH_2CH_3$. A compound is especially preferred, in which octyl-[($R^3$ are identical and each hydrogen, $R^2$=1,1,3, 3-tetramethylbutyl(diisobutylene)], nonyl-[($R^3$ are identical and each hydrogen, $R^2$=1,3,5-trimethylhexyl(tripropylene)], dodecyl-, dinonyl- or tributylphenolpolyglycolether (e.g. EO, PO, BuO), R—$C_6H_4$-β-(EO/PO/BuO)n with $R^4$=$C_8$ to $C_{12}$ alkyl and x=5 to 10, are present. Non-limiting examples of such compounds are: Norfox® OP-102, Surfonic® OP-120, T-Det® O-12.

Fatty acid ethoxylates are fatty acid esters, which have been treated with different amounts of ethylene oxide (EO).

Triglycerides are esters of the glycerols (glycerides), in which all three hydroxy-groups have been esterified using fatty acids. These can be modified by alkylene oxides.

Fatty acid alkanol amides are compounds of general formula (VI)

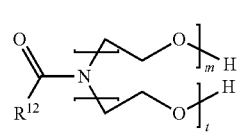

(VI)

which comprise at least one amide-group having one alkyl moiety $R^{12}$ and one or two alkoxyl-moiety(ies), whereby $R^{12}$ comprises 11 to 17 C-atoms and $1 \leq m+n \leq 5$.

Alkylpolyglycosides are mixtures of alkylmonoglucosides (alkyl-α-D- and -β-D-glucopyranoside plus small amounts of -glucofuranoside), alkyldiglucosides (-isomaltosides, -maltosides and others) and alkyloligoglucosides (-maltotriosides, -tetraosides and others). Alkylpolyglycosides are among other routes accessible by acid catalysed reaction (Fischer-reaction) from glucose (or starch) or from n-butyl-glucosides with fatty alcohols. Alkylpolyglycosides fit general formula (VII)

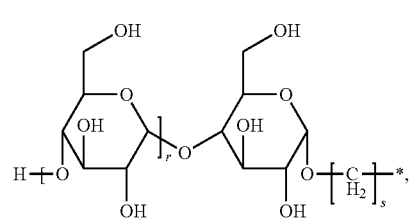

(VII)

with
r=0 to 3 and
s=4 to 20.

One example is Lutensol GD70.

In the group of non-ionic N-alkylated, preferably N-methylated, fatty acid amides of general formula (VIII)

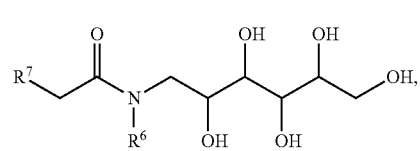

(VIII)

$R^6$ is a n-$C_{1-2}$-alkyl-moiety, $R^7$ an alkyl-moiety having 1 to 8 C-atoms. $R^7$ preferably is methyl.

A self-emulsifiable composition, wherein the additive(s) $A_x$ is/are selected from the group consisting of:
disinfectant, dye, acid, base, complexing agent, biocide, hydrotope, thickener, builder, cobuilder, enzyme, bleaching agent, bleach activator, bleaching catalyst, corrosion inhibitor, dye protection additive, dye transfer inhibitor, anti-greying agent, soil-release-polymer, fiber protection agent, silicon, bactericide, preserving agent, organic solvent, solubility adjustor, solubility enhancer, perfume, gel formers, dyes, pigments, photoprotective agents, consistency regulators, antioxidants, bleaches, care agents, tints, tanning agents, humectants, refatting agents, collagen, protein hydrolysates, lipids, emollients, softeners, antifoams, antistats, resins, solvents, solubility promoters, neutralizing agents, stabilizers, sterilizing agents, propellants, drying agents, opacifiers is preferred.

Disinfectants can be: oxidation agents, halogens such as chlorine and iodine and substances, which release the same, alcohols such as ethanol, 1-propanol and 2-propanol, aldehydes, phenoles, ethylene oxide, chlorohexidine and mecetroniummetilsulfate.

The advantage of using disinfectants is that pathogenic germs can hardly grow. Pathogenic germs can be: bacteria, spores, fungi and viruses.

Dyes can be besides others: Acid Blue 9, Acid Yellow 3, Acid Yellow 23, Acid Yellow 73, Pigment Yellow 101, Acid Green 1, Acid Green 25.

Acids are compounds that can advantageously be used to solve or to avoid scaling. Non-limiting examples of acids are formic acid, acetic acid, citric acid, hydrochloric acid, sulfuric acid and sulfonic acid.

Bases are compounds, which are useful for adjusting a preferable pH-range for complexing agents. Examples of bases, which can be used according to the present invention, are: NaOH, KOH and amine ethanol.

As inorganic builder the following are especially useful:
crystalline and amorphous alumino silicates having ion exchanging properties, such as zeolites: different types of zeolites are useful, especially those of type A, X, B, P, MAP and HS in their Na-modification or in modifications in which Na is partially substituted by other cat ions such as Li, K, Ca, Mg or ammonium;
crystalline silicates, such as disilicates and layer-silicates, e.g. δ- and β-$Na_2Si_2O_5$. The silicates can be used as alkali metal-, earth alkali metal- or ammonium salts, the Na-, Li- and Mg-silicates are preferred;
amorphous silicates, such as sodium metasilicate and amorphous disilicate;
carbonates and hydrogencarbonates: These can be used as alkali metal-, earth alkali metal- or ammonium salts. Na-, Li- and Mg-carbonates and -hydrogen carbonate, especially sodium carbonate and/or sodium hydrogen carbonate are preferred;
polyphosphates, such as pentanatriumtriphosphate.

Useful as oligomeric and polymeric cobuilders are:
Oligomeric and polymeric carbonic acids, such as homopolymers of acrylic acid and aspartic acid, oligomaleic acid, copolymers of maleic acid and acrylic acid, methacrylic acid or $C_2$-$C_{22}$-olefines, e.g. isobutene or long chain α-olefines, vinyl-$C_1$-$C_8$-alkylether, vinylacetate, vinylpropiovate, (meth)acryl acid ester of $C_1$-$C_8$-alcohols and styrene. Preferred are the homopolymers of acrylic acid and the copolymers of acrylic acid with maleic acid. The oligomeric and polymeric carbonic acids preferably are used as acids or as sodium salts.

Chelating agents are compounds, which can bind cat ions. They can be used to reduce water hardness and to precipitate heavy metals. Examples of complexing agents are: NTA, EDTA, MGDA, DTPA, DTPMP, IDS, HEDP, β-ADA, GLDA, citric acid, oxodisuccinic acid and butanetetracarbonic acid. The advantage of the use of these compounds lies in the fact that many compounds, which serve as cleaning agents, are more active in soft water. In addition to that scaling can be reduced or even be avoided. By using such compounds there is no need to dry a cleaned surface. This is an advantage in the work flow.

Useful anti greying agents are e.g. carboxymethylcellulose and graft polymers of vinyl acetate on polyethylene glycol.

Useful bleaching agents are e.g. adducts of hydrogenperoxide at inorganic salts, such as sodium perborate-monohydrate, sodium perborate-tetrahydrate and sodium carbonate-perhydrate, and percarbonic acids, such as phthalimidopercapronic acid.

As bleach activators compounds such as N,N,N',N'-tetraacetylethylendiamine (TAED), sodium-p-nonanoyloxybenzenesulfonate and N-methylmorpholiniumacetonitrilemethyl-sulfate are useful.

Useful enzymes are e.g. proteases, lipases, amylases, cellulases, mannanases, oxidases and peroxidases.

Useful as dye transfer inhibitors are e.g. homo-, co- and graft-polymers of 1-vinylpyrrolidone, 1-vinylimidazol or 4-vinylpyridine-N-oxide. Also homo- and copolymers of 4-vinylpyridin, which have been treated with chloro acetic acid are useful dye transfer inhibitors.

Biocides are compounds which kill bacteria. An example of a biocide is glutaric aldehyde. The advantage of the use of biocides is that the spreading of pathogenic germs is counteracted.

Hydrotropes are compounds which enhance the solubility of the surfactant/the surfactants in the chemical composition. An example is: cumolsulfonate.

Thickeners are compounds, which enhance the viscosity of the chemical composition. Non-limiting examples of thickeners are: polyacrylates and hydrophobically modified polyacrylates. The advantage of the use of thickeners is, that liquids having a higher viscosity have a longer residence time on the surface to be treated in the cases this surface is inclined or even vertical. This leads to an enhanced time of interaction.

A self-emulsifiable composition, which has a content of organic solvent below 50 mg/kg of emulsion is particularly preferred.

A self-emulsifiable composition that forms a transparent, homogeneous oil-phase forms one preferred embodiment of the present invention.

The self-emulsifiable compositions can be prepared by simply mixing and stirring the compounds a) to e) with each other until a homogeneous composition is obtained.

The step of combining the components can vary: in one preferred embodiment, polymer(s) $P_x$ is dissolved in polyisobutene, optionally comprising oil(s) and/or additional components, and then optionally combined with surfactants and additional components.

In another preferred embodiment, polymer(s) $P_x$ is optionally mixed with surfactants and/or additional components, and then combined with polyisobutene phase, comprising polyisobutene and optionally oil(s) and/or additional components.

The use of the self-emulsifiable composition as described above in chemical technical applications, car wash, cosmetics, plant protection, preparation and treatment of paper, textiles and leather, adhesives, dye and pigment formulations, coatings, pharmaceutical applications, construction, wood treatment forms another aspect of the present invention.

The use of the self-emulsifiable composition as described above in car wash, forms another aspect of the present invention.

Aspects of the invention include the use of the self-emulsifiable composition disclosed herein in laundry detergent compositions (e.g., TIDE™), hard surface cleaners (e.g., MR CLEAN™), automatic dishwashing liquids (e.g., CASCADE™), and dishwashing liquids (e.g., DAWN™). Non-limiting examples of cleaning compositions may include those described in U.S. Pat. Nos. 4,515,705; 4,537,706; 4,537,707; 4,550,862; 4,561,998; 4,597,898; 4,968,451; 5,565,145; 5,929,022; 6,294,514; and 6,376,445. The cleaning compositions disclosed herein are typically formulated such that, during use in aqueous cleaning operations, the wash water will have a pH of between about 6.5 and about 12, or between about 7.5 and 10.5. Liquid dishwashing product formulations typically have a pH between about 6.8 and about 9.0. Cleaning products are typically formulated to have a pH of from about 7 to about 12. Techniques for controlling pH at recommended usage levels include the use of buffers, alkalis, acids, etc., and are well known to those skilled in the art.

Fabric treatment compositions disclosed herein typically comprise a fabric softening active ("FSA") and a nonionic care agent disclosed herein. Suitable fabric softening actives, include, but are not limited to, materials selected from the group consisting of quats, amines, fatty esters, sucrose esters, silicones, dispersible polyolefins, clays, polysaccharides, fatty oils, polymer latexes and mixtures thereof.

Additional Fabric and/or Home Care Ingredients

The disclosed compositions may include additional adjunct ingredients. Adjunct ingredients include, but are not limited to, deposition aids, bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. The adjunct ingredients are in addition to an materials that are specifically recited in an embodiment that is disclosed and/or claimed. Each adjunct ingredient may be not essential to Applicants' compositions. Thus, certain embodiments of Applicants' compositions do not contain one or more of the following adjuncts materials: a deposition aids, bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below The following is a non-limiting list of suitable additional adjuncts.

Deposition Aid—In one aspect, the fabric treatment composition may comprise from about 0.01% to about 10%, from about 0.05 to about 5%, or from about 0.15 to about 3% of a deposition aid. Suitable deposition aids are disclosed in, for example, U.S. patent application Ser. No. 12/080,358.

In one aspect, the deposition aid may be a cationic or amphoteric polymer. In another aspect, the deposition aid may be a cationic polymer. Cationic polymers in general and their method of manufacture are known in the literature. In one aspect, the cationic polymer may have a cationic charge density of from about 0.005 to about 23, from about 0.01 to about 12, or from about 0.1 to about 7 milliequivalents/g, at the pH of intended use of the composition. For amine-containing polymers, wherein the charge density depends on the pH of the composition, charge density is measured at the intended use pH of the product. Such pH will generally range from about 2 to about 11, more generally from about 2.5 to about 9.5. Charge density is calculated by dividing the number of net charges per repeating unit by the molecular weight of the repeating unit. The positive charges may be located on the backbone of the polymers and/or the side chains of polymers.

Non-limiting examples of deposition enhancing agents are cationic or amphoteric, polysaccharides, proteins and synthetic polymers. Cationic polysaccharides include cationic cellulose derivatives, cationic guar gum derivatives, chitosan and derivatives and cationic starches. Cationic polysaccharides have a molecular weight from about 50,000 to about 2 million, or even from about 100,000 to about 3,500,000. Suitable cationic polysaccharides include cationic cellulose ethers, particularly cationic hydroxyethylcellulose and cationic hydroxypropylcellulose. Examples of cationic hydroxyalkyl cellulose include those with the INCI name Polyquaternium 10 such as those sold under the trade names Ucare™ Polymer JR 30M, JR 400, JR 125, LR 400 and LK 400 polymers; Polyquaternium 67 such as those sold under the trade name Softcat SK™, all of which are marketed by Amerchol Corporation, Edgewater N.J.; and Polyquaternium 4 such as those sold under the trade name Celquat™ H200 and Celquat™ L-200 available from National Starch and Chemical Company, Bridgewater, N.J. Other suitable polysaccharides include Hydroxyethyl cellulose or hydroxypropylcellulose quaternized with glycidyl C12-C22 alkyl dimethyl ammonium chloride. Examples of such polysaccharides include the polymers with the INCI names Polyquaternium 24 such as those sold under the trade name Quaternium LM 200 by Amerchol Corporation, Edgewater N.J. Cationic starches described by D. B. Solarek in Modified Starches, Properties and Uses published by CRC Press (1986) and in U.S. Pat. No. 7,135,451, col. 2, line 33-col. 4, line 67. Cationic galactomannans include cationic guar gums or cationic locust bean gum. An example of a cationic guar gum is a quaternary ammonium derivative of Hydroxypropyl Guar such as those sold under the trade name Jaguar® C13 and Jaguar® Excel available from Rhodia, Inc of Cranbury N.J. and N-Hance by Aqualon, Wilmington, Del.

Another group of suitable cationic polymers includes those produced by polymerization of ethylenically unsaturated monomers using a suitable initiator or catalyst, such as those disclosed in U.S. Pat. No. 6,642,200.

Suitable polymers may be selected from the group consisting of cationic or amphoteric polysaccharide, polyethylene imine and its derivatives, and a synthetic polymer made by polymerizing one or more cationic monomers selected from the group consisting of N,N-dialkylaminoalkyl acrylate, N,N-dialkylaminoalkyl methacrylate, N,N-dialkylaminoalkyl acrylamide, N,N-dialkylaminoalkylmethacrylamide, quaternized N,N dialkylaminoalkyl acrylate quaternized N,N-dialkylaminoalkyl methacrylate, quaternized N,N-dialkylaminoalkyl acrylamide, quaternized N,N-dialkylaminoalkylmethacrylamide, Methacryloamidopropyl-pentamethyl-1,3-propylene-24-ammonium dichloride, N,N,N,N',N', N",N"-heptamethyl-N"-3-(1-oxo-2-methyl-2-propenyl) aminopropyl-9-oxo-8-azo-decane-1,4,10-triammonium trichloride, vinylamine and its derivatives, allylamine and its derivatives, vinyl imidazole, quaternized vinyl imidazole and diallyl dialkyl ammonium chloride and combinations thereof, and optionally a second monomer selected from the group consisting of acrylamide, N,N-dialkyl acrylamide, methacrylamide, N,N-dialkylmethacrylamide, C1-C12 alkyl acrylate, C1-C12 hydroxyalkyl acrylate, polyalkylene glyol acrylate, C1-C12 alkyl methacrylate, C1-C12 hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and derivatives, acrylic acid, methacrylic acid, maleic acid, vinyl sulfonic acid, styrene sulfonic acid, acrylamidopropylmethane sulfonic acid (AMPS) and their salts. The polymer may optionally be branched or cross-linked by using branching and crosslinking monomers. Branching and crosslinking monomers include ethylene glycoldiacrylate divinylbenzene, and butadiene. In another aspect, the treatment composition may comprise an amphoteric deposition aid polymer so long as the polymer possesses a net positive charge. Said polymer may have a cationic charge density of about 0.05 milliequivalents/g. to about 18 milliequivalents/g.

In another aspect, the deposition aid may be selected from the group consisting of cationic polysaccharide, polyethylene imine and its derivatives, poly(acrylamide-co-diallyldimethylammonium chloride), poly(acrylamide-methacrylamidopropyltrimethyl ammonium chloride), poly(acrylamide-co-N,N-dimethyl aminoethyl acrylate) and its quaternized derivatives, poly(acrylamide-co-N,N-dimethyl aminoethyl methacrylate) and its quaternized derivative, poly(hydroxyethylacrylate-co-dimethyl aminoethyl methacrylate), poly(hydroxypropylacrylate-codimethyl aminoethyl methacrylate), poly(hydroxypropylacrylate-comethacrylamidopropyltrimethylammonium chloride), poly(acrylamide-codiallyldimethylammonium chloride-co-acrylic acid), poly(acrylamidemethacrylamidopropyltrimethyl ammonium chloride-co-acrylic acid), poly(diallyldimethyl ammonium chloride), poly(vinylpyrrolidone-co-dimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinyl imidazole) and poly(acrylamide-co-Methacryloamidopropyl-pentamethyl-1,3-propylene-2-ol-ammonium dichloride), Suitable deposition aids include Polyquaternium-1, Polyquaternium-5, Polyquaternium-6, Polyquaternium-7, Polyquaternium-8, Polyquaternium-11, Polyquaternium-14, Polyquaternium-22, Polyquaternium-28, Polyquaternium-30, Polyquaternium-32 and Polyquaternium-33, as named under the International Nomenclature for Cosmetic Ingredients.

In one aspect, the deposition aid may comprise polyethyleneimine or a polyethyleneimine derivative. A suitable polyethyleneinine useful herein is that sold under the trade name Lupasol® by BASF, SE, and Ludwigshafen, Germany In another aspect, the deposition aid may comprise a cationic acrylic based polymer. In a further aspect, the deposition aid may comprise a cationic polyacrylamide. In another aspect, the deposition aid may comprise a polymer comprising polyacrylamide and polymethacrylamidopropyl trimethylammonium cation. In another aspect, the deposition aid may comprise poly(acrylamide-N-dimethyl aminoethyl acrylate) and its quaternized derivatives. In this aspect, the deposition aid may be that sold under the trade name Sedipur®, available from BTC Specialty Chemicals, a BASF Group, Florham Park, N.J. In a yet further aspect, the deposition aid may comprise poly(acrylamide-co-methacrylamidopropyltrimethyl ammonium chloride). In another aspect, the deposition aid may comprise a non-acrylamide based polymer, such as that sold under the trade name Rheovis® CDE, available from Ciba Specialty Chemicals, a BASF, SE group, Florham Park, N.J., or as disclosed in USPA 2006/0252668.

In another aspect, the deposition aid may be selected from the group consisting of cationic or amphoteric polysaccharides. In one aspect, the deposition aid may be selected from the group consisting of cationic and amphoteric cellulose ethers, cationic or amphoteric galactomannan, cationic guar gum, cationic or amphoteric starch, and combinations thereof.

Another group of suitable cationic polymers may include alkylamine-epichlorohydrin polymers which are reaction products of amines and oligoamines with epichlorohydrin, for example, those polymers listed in, for example, U.S. Pat. Nos. 6,642,200 and 6,551,986. Examples include dimethylamine-epichlorohydrin-ethylenediamine, available under the trade name Cartafix® CB and Cartafix® TSF from Clariant, Basle, Switzerland.

Another group of suitable synthetic cationic polymers may include polyamidoamine-epichlorohydrin (PAE) resins of polyalkylenepolyamine with polycarboxylic acid. The most common PAE resins are the condensation products of diethylenetriamine with adipic acid followed by a subsequent reaction with epichlorohydrin. They are available from Hercules Inc. of Wilmington Del. under the trade name Kymene™ or from BASF SE (Ludwigshafen, Germany) under the trade name Luresin™. The cationic polymers may contain charge neutralizing anions such that the overall polymer is neutral under ambient conditions. Non-limiting examples of suitable counter ions (in addition to anionic species generated during use) include chloride, bromide, sulfate, methylsulfate, sulfonate, methylsulfonate, carbonate, bicarbonate, formate, acetate, citrate, nitrate, and mixtures thereof.

The weight-average molecular weight of the polymer may be from about 500 Daltons to about 5,000,000 Daltons, or from about 1,000 Daltons to about 2,000,000 Daltons, or from about 2,500 Daltons to about 1,500,000 Daltons, as determined by size exclusion chromatography relative to polyethylene oxide standards with RI detection. In one aspect, the MW of the cationic polymer may be from about 500 Daltons to about 37,500 Daltons.

Surfactants: The products of the present invention may comprise from about 0.11% to 80% by weight of a surfactant. In one aspect, such compositions may comprise from about 5% to 50% by weight of surfactant. Surfactants utilized can be of the anionic, nonionic, zwitterionic, ampholytic or cationic type or can comprise compatible mixtures of these types. Detergent surfactants useful herein are described in U.S. Pat. Nos. 3,664,961, 3,919,678, 4,222,905, 4,239,659, 6,136,769, 6,020,303, and 6,060,443.

Anionic and nonionic surfactants are typically employed if the fabric care product is a laundry detergent. On the other hand, cationic surfactants are typically employed if the fabric care product is a fabric softener.

Useful anionic surfactants can themselves be of several different types. For example, water-soluble salts of the higher fatty acids, i.e., "soaps", are useful anionic surfactants in the compositions herein. This includes alkali metal soaps such as the sodium, potassium, ammonium, and alkylolammonium salts of higher fatty acids containing from about 8 to about 24 carbon atoms, or even from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants include the water-soluble salts, particularly the alkali metal, ammonium and alkylolammonium (e.g., monoethanolammonium or triethanolammonium) salts, of organic sulfuric reaction products having in their molecular structure an alkyl group containing from about 10 to about 20 carbon atoms and a sulfonic acid or sulfuric acid ester group. (Included in the term "alkyl" is the alkyl portion of aryl groups.) Examples of this group of synthetic surfactants are the alkyl sulfates and alkyl alkoxy sulfates, especially those obtained by sulfating the higher alcohols (C8-C18 carbon atoms).

Other useful anionic surfactants herein include the water-soluble salts of esters of α-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; water-soluble salts of olefin sulfonates containing from about 12 to 24 carbon atoms; and R-alkyloxy alkane sulfonates containing from about 1 to 3 carbon atoms in the alkyl group and from about 8 to 20 carbon atoms in the alkane moiety. In another embodiment, the anionic surfactant may comprise a C11-C18 alkyl benzene sulfonate surfactant; a C10-C20 alkyl sulfate surfactant; a C10-C18 alkyl alkoxy sulfate surfactant, having an average degree of alkoxylation of from 1 to 30, wherein the alkoxy comprises a C1-C4 chain and mixtures thereof; a mid-chain branched alkyl sulfate surfactant; a mid-chain branched alkyl alkoxy sulfate surfactant having an average degree of alkoxylation of from 1 to 30, wherein the alkoxy comprises a C1-C4 chain and mixtures thereof; a C10-C18 alkyl alkoxy carboxylates comprising an average degree of alkoxylation of from 1 to 5; a C12-O20 methyl ester sulfonate surfactant, a C10-C18 alpha-olefin sulfonate surfactant, a C6-C20 sulfosuccinate surfactant, and a mixture thereof.

In addition to the anionic surfactant, the fabric care compositions of the present invention may further contain a nonionic surfactant. The compositions of the present invention can contain up to about 30%, alternatively from about 0.01% to about 20%, more alternatively from about 0.1% to about 10%, by weight of the composition, of a nonionic surfactant. In one embodiment, the nonionic surfactant may comprise an ethoxylated nonionic surfactant. Examples of suitable nonionic surfactants are provided in U.S. Pat. Nos. 4,285,841, 6,150,322, and 6,153,577.

Suitable for use herein are the ethoxylated alcohols and ethoxylated alkyl phenols of the formula R(OC2H4)nOH, wherein R is selected from the group consisting of aliphatic hydrocarbon radicals containing from about 8 to about 20 carbon atoms and alkyl phenyl radicals in which the alkyl groups contain from about 8 to about 12 carbon atoms, and the average value of n is from about 5 to about 15.

Suitable nonionic surfactants are those of the formula R1(OC2H4)nOH, wherein R1 is a C10-C16 alkyl group or a C8-C12 alkyl phenyl group, and n is from 3 to about 80. In one aspect, particularly useful materials are condensation products of C9-C15 alcohols with from about 5 to about 20 moles of ethylene oxide per mole of alcohol.

Additional suitable nonionic surfactants include polyhydroxy fatty acid amides such as N-methyl N-1-deoxyglucityl cocoamide and N-methyl N-1-deoxyglucityl oleamide and alkyl polysaccharides such as the ones described in U.S. Pat. No. 5,332,528. Alkylpolysaccharides disclosed in U.S. Pat. No. 4,565,647.

The fabric care compositions of the present invention may contain up to about 30%, alternatively from about 0.01% to about 20%, more alternatively from about 0.1% to about 20%, by weight of the composition, of a cationic surfactant. For the purposes of the present invention, cationic surfactants include those which can deliver fabric care benefits. Non-limiting examples of useful cationic surfactants include: fatty amines; quaternary ammonium surfactants; and imidazoline quat materials.

In some embodiments, useful cationic surfactants, include those disclosed in U.S. Patent Application number 2005/0164905 A1 and having the general formula (XIII):

wherein:
(a) R1 and R2 each are individually selected from the groups of: C1-C4 alkyl; C1-C4 hydroxy alkyl; benzyl; —(CnH2nO)xH, wherein:
i. x has a value from about 2 to about 5;
ii. n has a value of about 1-4;
(b) R3 and R4 are each:
i. a C8-C22 alkyl; or
ii. R3 is a C8-C22 alkyl and R4 is selected from the group of: C1-C10 alkyl; C1-C10 hydroxy alkyl; benzyl; —(CnH2nO)xH, wherein:
1. x has a value from 2 to 5; and
2. n has a value of 1-4; and
(c) X is an anion.

Fabric Softening Active Compounds—The fabric softening active may comprise, as the principal active, compounds of the following formula:

$$\{R4\text{-}m\text{-}N+\text{—}[X\text{—}Y\text{—}R1]m\}X\text{—} \quad (XIV)$$

wherein each R may comprise either hydrogen, a short chain C1-C6, in one aspect a C1-C3 alkyl or hydroxyalkyl group, for example methyl, ethyl, propyl, hydroxyethyl, and the like, poly(C2-3 alkoxy), polyethoxy, benzyl, or mixtures thereof; each X may independently be (CH2)n, CH2-CH(CH3)- or CH—(CH3)-CH2-; each Y may comprise —O—(O)C—, —C(O)—O—, —NR—C(O)—, or —C(O)—NR—; each m may be 2 or 3; each n may be from 1 to about 4, in one aspect 2; the sum of carbons in each R1, plus one when Y is —O—(O)C— or —NR—C(O)—, may be C12-C22, or C14-C20, with each R1 being a hydrocarbyl, or substituted hydrocarbyl group; and X— may comprise any softener-compatible anion. In one aspect, the softener-compatible anion may comprise chloride, bromide, methylsulfate, ethylsulfate, sulfate, and nitrate. In another aspect, the softener-compatible anion may comprise chloride or methyl sulfate.

In another aspect, the fabric softening active may comprise the general formula (XV):

$$[R3N+CH2CH(YR1)(CH2YR1)]X\text{—} \quad \text{Formula (XV)}$$

wherein each Y, R, R1, and X— have the same meanings as before. Such compounds include those having the formula (XVI):

$$[CH3]3N(+)[CH2CH(CH2O(O)CR1)O(O)CR1]Cl(-) \quad (XVI)$$

wherein each R may comprise a methyl or ethyl group. In one aspect, each R1 may comprise a C15 to C19 group. As used herein, when the diester is specified, it can include the monoester that is present.

These types of agents and general methods of making them are disclosed in U.S. Pat. No. 4,137,180. An example of a suitable DEQA (2) is the "propyl" ester quaternary ammonium fabric softener active comprising the formula 1,2-di(acyloxy)-3-trimethylammoniopropane chloride.

In one aspect, the fabric softening active may comprise the formula (XVII):

[R4-m-N+—R1m]X—          (XVII)

wherein each R, R1, m and X— have the same meanings as before.

In a further aspect, the fabric softening active may comprise the formula (XVIII):

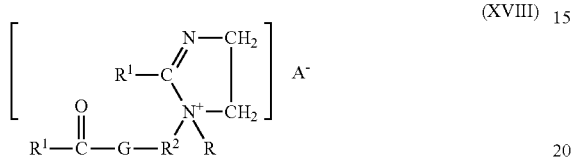

wherein each R and R1 have the definitions given above; R2 may comprise a C1-6 alkylene group, in one aspect an ethylene group; and G may comprise an oxygen atom or an —NR— group; and A- is as defined below.

In a yet further aspect, the fabric softening active may comprise the formula (XIX):

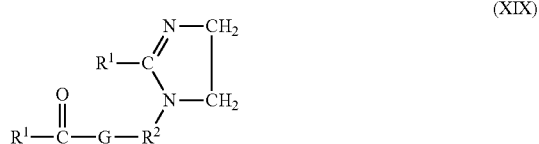

wherein R1, R2 and G are defined as above.

In a further aspect, the fabric softening active may comprise condensation reaction products of fatty acids with dialkylenetriamines in, e.g., a molecular ratio of about 2:1, said reaction products containing compounds of the formula (XX):

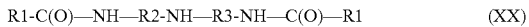

R1-C(O)—NH—R2-NH—R3-NH—C(O)—R1      (XX)

wherein R1, R2 are defined as above, and R3 may comprise a C1-6 alkylene group, or an ethylene group and wherein the reaction products may optionally be quaternized by the additional of an alkylating agent such as dimethyl sulfate. Such quaternized reaction products are described in additional detail in U.S. Pat. No. 5,296,622.

In a yet further aspect, the fabric softening active may comprise the formula (XXI):

[R1-C(O)—NR—R2-N(R)2-R3-NR—C(O)—R1]+A-      (XXI)

wherein R, R1, R2 and R3 are defined as above; A- is as defined below;

In a yet further aspect, the fabric softening active may comprise reaction products of fatty acid with hydroxyalkylalkylenediamines in a molecular ratio of about 2:1, said reaction products containing compounds of the formula (XXII):

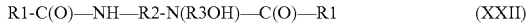

R1-C(O)—NH—R2-N(R3OH)—C(O)—R1      (XXII)

wherein R1, R2 and R3 are defined as above;

In a yet further aspect, the fabric softening active may comprise the formula (XXIII):

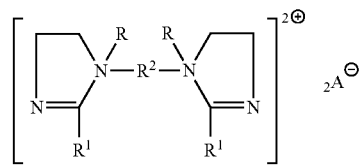

wherein R, R1 and R2 are defined as above; A- is as defined below.

In yet a further aspect, the fabric softening active may comprise the formula (XXIV);

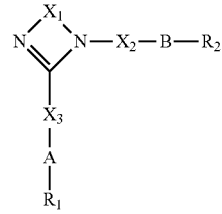

Formula (XXIV)

wherein;

X1 may comprise a C2-3 alkyl group, in one aspect, an ethyl group;

X2 and X3 may independently comprise C1-6 linear or branched alkyl or alkenyl groups, in one aspect, methyl, ethyl or isopropyl groups;

R1 and R2 may independently comprise C8-22 linear or branched alkyl or alkenyl groups;

characterized in that;

A and B are independently selected from the group comprising —O—(C=O)—, —(C=O)—O—, or mixtures thereof, in one aspect, —O—(C=O)—.

Non-limiting examples of fabric softening actives comprising formula (XIV) are N,N-bis(stearoyloxy-ethyl) N,N-dimethyl ammonium chloride, N,N-bis(tallowoyl-oxy-ethyl) N,N-dimethyl ammonium chloride, N,N-bis(stearoyl-oxy-ethyl) N-(2 hydroxyethyl) N-methyl ammonium methylsulfate.

A non-limiting example of fabric softening actives comprising formula (XVI) is 1,2 di(stearoyloxy) 3 trimethyl ammoniumpropane chloride.

Non-limiting examples of fabric softening actives comprising formula (XVII) may include dialkylenedimethylammonium salts such as dicanoladimethylammonium chloride, di(hard)tallowedimethylammonium chloride dicanoladimethylammonium methylsulfate. An example of commercially available dialkylenedimethylammonium salts usable in the present invention is dioleyldimethylammonium chloride available from Witco Corporation under the trade name Adogen® 472 and dihardtallow dimethylammonium chloride available from Akzo Nobel Arquad 2HT75.

A non-limiting example of fabric softening actives comprising formula (XVIII) may include 1-methyl-1-stearoylamidoethyl-2-stearoylimidazolinium methylsulfate wherein R1 is an acyclic aliphatic C15-C17 hydrocarbon group, R2 is an ethylene group, G is a NH group, R5 is a methyl group and A- is a methyl sulfate anion, available commercially from the Witco Corporation under the trade name Varisoft®.

A non-limiting example of fabric softening actives comprising formula (XIX) is 1-tallowylamidoethyl-2-tallowylimidazoline wherein R1 may comprise an acyclic aliphatic C15-C17 hydrocarbon group, R2 may comprise an ethylene group, and G may comprise a NH group.

A non-limiting example of a fabric softening active comprising formula (XX) is the reaction products of fatty acids with diethylenetriamine in a molecular ratio of about 2:1, said reaction product mixture comprising N,N''-dialkyldiethylenetriamine having the formula (XXV):

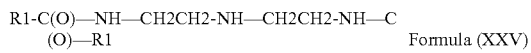

R1-C(O)—NH—CH2CH2-NH—CH2CH2-NH—C(O)—R1    Formula (XXV)

wherein R1 is an alkyl group of a commercially available fatty acid derived from a vegetable or animal source, such as Emersol® 223LL or Emersol® 7021, available from Henkel Corporation, and R2 and R3 are divalent ethylene groups.

A non-limiting example of Compound (XXI) is a difatty amidoamine based softener having the formula (XXVI):

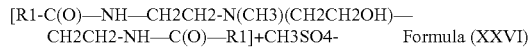

[R1-C(O)—NH—CH2CH2-N(CH3)(CH2CH2OH)—CH2CH2-NH—C(O)—R1]+CH3SO4-    Formula (XXVI)

wherein R1 is an alkyl group. An example of such compound is that commercially available from the Witco Corporation e.g. under the trade name Varisoft® 222LT.

An example of a fabric softening active comprising formula (XXII) is the reaction products of fatty acids with N-2-hydroxyethylethylenediamine in a molecular ratio of about 2:1, said reaction product mixture comprising the formula (XXVII):

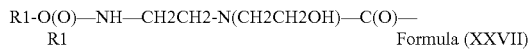

R1-O(O)—NH—CH2CH2-N(CH2CH2OH)—C(O)—R1    Formula (XXVII)

wherein R1-C(O) is an alkyl group of a commercially available fatty acid derived from a vegetable or animal source, such as Emersol® 223LL or Emersol® 7021, available from Henkel Corporation.

An example of a fabric softening active comprising formula (XXIII) is the diquaternary compound having the formula (XXVIII):

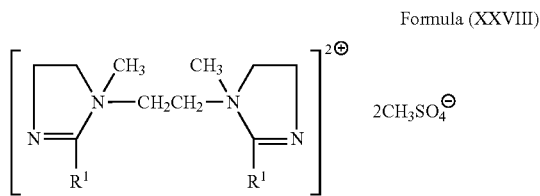

Formula (XXVIII)

wherein R1 is derived from fatty acid. Such compound is available from Witco Company.

A non-limiting example of a fabric softening active comprising formula (XXIV) is a dialkyl imidazoline diester compound, where the compound is the reaction product of N-(2-hydroxyethyl)-1,2-ethylenediamine or N-(2-hydroxyisopropyl)-1,2-ethylenediamine with glycolic acid, esterified with fatty acid, where the fatty acid is (hydrogenated) tallow fatty acid, palm fatty acid, hydrogenated palm fatty acid, oleic acid, rapeseed fatty acid, hydrogenated rapeseed fatty acid or a mixture of the above.

It will be understood that combinations of softener actives disclosed above are suitable for use herein.

Anion A

In the cationic nitrogenous salts herein, the anion A-, which comprises any softener compatible anion, provides electrical neutrality. Most often, the anion used to provide electrical neutrality in these salts is from a strong acid, especially a halide, such as chloride, bromide, or iodide. However, other anions can be used, such as methylsulfate, ethylsulfate, acetate, formate, sulfate, carbonate, and the like. In one aspect, the anion A may comprise chloride or methylsulfate.

The anion, in some aspects, may carry a double charge. In this aspect, A- represents half a group.

In one aspect, the fabric care and/or treatment composition may comprise a second softening agent selected from the group consisting of polyglycerol esters (PGEs), oily sugar derivatives, and wax emulsions. Suitable PGEs include those disclosed in U.S. PA 61/089,080. Suitable oily sugar derivatives and wax emulsions include those disclosed in USPA 2008-0234165 A1.

In one aspect, the compositions may comprise from about 0.001% to about 0.01% of an unsaturated aldehyde. In one aspect, the compositions are essentially free of an unsaturated aldehyde. Without being limited by theory, in this aspect, the compositions are less prone to the yellowing effect often encountered with amino-containing agents.

Builders—The compositions may also contain from about 0.1% to 80% by weight of a builder. Compositions in liquid form generally contain from about 1% to 10% by weight of the builder component. Compositions in granular form generally contain from about 1% to 50% by weight of the builder component. Detergent builders are well known in the art and can contain, for example, phosphate salts as well as various organic and inorganic nonphosphorus builders. Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid. Other suitable polycarboxylates for use herein are the polyacetal carboxylates described in U.S. Pat. No. 4,144,226 and U.S. Pat. No. 4,246,495. Other polycarboxylate builders are the oxydisuccinates and the ether carboxylate builder compositions comprising a combination of tartrate monosuccinate and tartrate disuccinate described in U.S. Pat. No. 4,663,071, Builders for use in liquid detergents are described in U.S. Pat. No. 4,284,532, One suitable builder includes may be citric acid. Suitable nonphosphorus, inorganic builders include the silicates, aluminosilicates, borates and carbonates, such as sodium and potassium carbonate, bicarbonate, sesquicarbonate, tetraborate decahydrate, and silicates having a weight ratio of SiO2 to alkali metal oxide of from about 0.5 to about 4.0, or from about 1.0 to about 2.4. Also useful are aluminosilicates including zeolites. Such materials and their use as detergent builders are more fully discussed in U.S. Pat. No. 4,605,509. Dispersants—The compositions may contain from about 0.1%, to about 10%, by weight of dispersants Suitable water-soluble organic materials are the homo- or co-polymeric acids or their salts, in which the polycarboxylic acid may contain at least two carboxyl radicals separated from each other by not more than two carbon atoms. The dispersants may also be alkoxylated derivatives of polyamines, and/or quaternized derivatives thereof such as those described in U.S. Pat. Nos. 4,597,898, 4,676,921, 4,891,160, 4,659,802 and 4,661,288. Enzymes—The compositions may contain one or more detergent enzymes which provide cleaning performance and/or fabric care benefits. Examples of suitable enzymes include hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, R-glucanases, arabinosidases, hyaluronidase, chondroitinase, laccase, and amylases, or mixtures thereof. A typical combination may be a cocktail of conventional applicable enzymes like protease, lipase, cutinase and/or cellulase in conjunction with amylase. Enzymes can be used at their art-taught levels, for example at levels recommended by suppliers such as Novozymes and Genencor. Typical levels in the compositions are from about 0.0001% to about 5%. When enzymes are present, they can be used at very low levels, e.g., from about 0.001% or lower; or they can be used in heavier-duty laundry detergent formulations at higher levels, e.g., about 0.1% and higher. In accordance with a preference of some consumers for "non-biological" detergents, the compositions may be either or both enzyme-containing and enzyme-free.

Dye Transfer Inhibiting Agents—The compositions may also include from about 0.0001%, from about 0.01%, from about 0.05% by weight of the compositions to about 10%, about 2%, or even about 1% by weight of the compositions of one or more dye transfer inhibiting agents such as polyvinylpyrrolidone polymers, polyamine N-oxide polymers, copolymers of N-vinylpyrrolidone and N-vinylimidazole, polyvinyloxazolidones and polyvinylimidazoles or mixtures thereof.

Chelant—The compositions may contain less than about 5%, or from about 0.01% to about 3% of a chelant such as citrates; nitrogen-containing, P-free aminocarboxylates such as EDDS, EDTA and DTPA; aminophosphonates such as diethylenetriamine pentamethylenephosphonic acid and, ethylenediamine tetramethylenephosphonic acid; nitrogen-free phosphonates e.g., HEDP; and nitrogen or oxygen containing, P-free carboxylate-free chelants such as compounds of the general class of certain macrocyclic N-ligands such as those known for use in bleach catalyst systems.

Brighteners—The compositions may also comprise a brightener (also referred to as "optical brightener") and may include any compound that exhibits fluorescence, including compounds that absorb UV light and reemit as "blue" visible light. Non-limiting examples of useful brighteners include: derivatives of stilbene or 4,4'-diaminostilbene, biphenyl, five-membered heterocycles such as triazoles, pyrazolines, oxazoles, imidiazoles, etc., or six-membered heterocycles (coumarins, naphthalamide, s-triazine, etc.). Cationic, anionic, nonionic, amphoteric and zwitterionic brighteners can be used. Suitable brighteners include those commercially marketed under the trade name Tinopal-UNPA-GX® by Ciba Specialty Chemicals Corporation, a BASF, SE group; (High Point, N.C.).

Bleach system—Bleach systems suitable for use herein contain one or more bleaching agents. Non-limiting examples of suitable bleaching agents include catalytic metal complexes; activated peroxygen sources; bleach activators; bleach boosters; photobleaches; bleaching enzymes; free radical initiators; H2O2; hypohalite bleaches; peroxygen sources, including perborate and/or percarbonate and combinations thereof. Suitable bleach activators include perhydrolyzable esters and perhydrolyzable imides such as, tetraacetyl ethylene diamine, octanoylcaprolactam, benzoyloxybenzenesulphonate, nonanoyloxybenzene-sulphonate, benzoylvalerolactam, dodecanoyloxybenzenesulphonate. Suitable bleach boosters include those described in U.S. Pat. No. 5,817,614. Other bleaching agents include metal complexes of transitional metals with ligands of defined stability constants. Such catalysts are disclosed in U.S. Pat. Nos. 4,430,243, 5,576,282, 5,597,936 and 5,595,967.

Stabilizer—The compositions may contain one or more stabilizers and thickeners. Any suitable level of stabilizer may be of use; exemplary levels include from about 0.01% to about 20%, from about 0.1% to about 10%, or from about 0.1% to about 3% by weight of the composition. Non-limiting examples of stabilizers suitable for use herein include crystalline, hydroxyl-containing stabilizing agents, trihydroxystearin, hydrogenated oil, or a variation thereof, and combinations thereof. In some aspects, the crystalline, hydroxyl-containing stabilizing agents may be water-insoluble wax-like substances, including fatty acid, fatty ester or fatty soap. In other aspects, the crystalline, hydroxyl-containing stabilizing agents may be derivatives of castor oil, such as hydrogenated castor oil derivatives, for example, castor wax. The hydroxyl containing stabilizers are disclosed in U.S. Pat. Nos. 6,855,680 and 7,294,611. Other stabilizers include thickening stabilizers such as gums and other similar polysaccharides, for example gellan gum, carrageenan gum, and other known types of thickeners and rheological additives. Exemplary stabilizers in this class include gum-type polymers (e.g. xanthan gum), polyvinyl alcohol and derivatives thereof, cellulose and derivatives thereof including cellulose ethers and cellulose esters and tamarind gum (for example, comprising xyloglucan polymers), guar gum, locust bean gum (in some aspects comprising galactomannan polymers), and other industrial gums and polymers.

For the purposes of the present invention, the non-limiting list of adjuncts illustrated hereinafter are suitable for use in the instant compositions and may be desirably incorporated in certain embodiments of the invention, for example to assist or enhance performance, for treatment of the substrate to be cleaned, or to modify the aesthetics of the composition as is the case with perfumes, colorants, dyes or the like. It is understood that such adjuncts are in addition to the components that are supplied via Applicants' perfumes and/or perfume systems. The precise nature of these additional components, and levels of incorporation thereof, will depend on the physical form of the composition and the nature of the operation for which it is to be used. Suitable adjunct materials include, but are not limited to, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

Silicones—Suitable silicones comprise Si—O moieties and may be selected from (a) non-functionalized siloxane polymers, (b) functionalized siloxane polymers, and combinations thereof. The molecular weight of the organosilicone is usually indicated by the reference to the viscosity of the material. In one aspect, the organosilicones may comprise a viscosity of from about 10 to about 2,000,000 centistokes at 25° C. In another aspect, suitable organosilicones may have a viscosity of from about 10 to about 800,000 centistokes at 25° C. Suitable organosilicones may be linear, branched or cross-linked. In one aspect, the organosilicones may be linear.

The present invention will be disclosed further by the following non-limiting examples:

The present invention will be disclosed further by the following non-limiting examples:

EXAMPLES

Examples of Polyisobutene Premixes (PM)

Assessment of the Premixes and Formulations

The premixes or formulations are assessed "clear", when the transmittance of the formulation, measured with a CADAS 200 spectrophotometer (Dr. Lange Company) at 650 nm in a 1 cm cuvette is higher than 90%. The premix or formulations are assessed "homogeneous", when upon visual inspection no creaming/sedimentation or phase separation can be observed after one day. The premixes or formulations are assessed "phase separated" when the mixture separated into clearly recognizable organic and aqueous phases, or if droplets of organic phase could be observed on top of the aqueous phase.

Example

Polyisobutene Premix PM1

Polyisobutene (6.0 g, 60 parts per weight, molecular weight 1000 g/mol) and polyisobutene succinic anhydride (3.0 g, 30 parts per weight) were mixed in a 25 ml glass vial and stirred at low shear with a magnetic stirrer bar. The mixture was heated to 80° C. to reduce viscosity and thus simplify mixing. Nonionic surfactant C10-Guerbetalcohol alkoxylate (HLB 12.5) (1.0 g, 10 parts per weight) was added and the resulting mixture was stirred for 5 min, yielding an emulsifiable polyisobutene composition PM1 in the form of a homogeneous, clear and stable solution.

Example

Polyisobutene Premixes PM2-PM5

The mixture is prepared in the same way as Example PM1, applying the ratios given in the table below. All examples formed homogeneous, clear and stable solutions.

| Example | PIB [wt.-%] | PIBSA [wt.-%] | Surfactant [wt.-%] | Solution properties |
|---|---|---|---|---|
| PM1 | 60 | 30 | 10 | Homogeneous, clear, stable |
| PM2 | 70 | 20 | 10 | Homogeneous, clear, stable |
| PM3 | 40 | 35 | 25 | Homogeneous, clear, stable |
| PM4 | 40 | 45 | 15 | Homogeneous, clear, stable |
| PM5 | 40 | 55 | 5 | Homogeneous, clear, stable |

Example

Polyisobutene Premix PM6

Polyisobutene (6.0 g, 60 parts per weight, molecular weight 1000 g/mol) and polyisobutene succinic anhydride (3.0 g, 30 parts per weight) were mixed in a 25 ml glass vial and stirred at low shear with a magnetic stirrer bar. The mixture was heated to 80° C. to reduce viscosity and thus simplify mixing. A surfactant mixture of nonionic surfactants C13-oxoalcohol+3 EO (HLB 9) (0.5 g, 5 parts per weight) and C13-oxoalcohol+8 EO (HLB 13) (0.5 g, 5 parts per weight) was added and the resulting mixture was stirred for 5 min, yielding an emulsifiable polyisobutene composition PM6 in the form of a homogeneous, clear and stable solution.

Example

Polyisobutene Premixes PM7-PM10

The following examples were done analogous to example PM3, taking the composition given in the table.

| Example | PIB [wt.-%] | PIBSA [wt.-%] | Surfactant Mix [wt.-%] | Solution properties |
|---|---|---|---|---|
| PM6 | 60 | 30 | 10 | Homogeneous, clear, stable |
| PM7 | 70 | 20 | 10 | Homogeneous, clear, stable |
| PM8 | 40 | 35 | 25 | Homogeneous, clear, stable |
| PM9 | 40 | 45 | 15 | Homogeneous, clear, stable |
| PM10 | 40 | 55 | 5 | Homogeneous, clear, stable |

The following comparative examples were done analogous to example PM3, taking the composition given in the table below. All emulsions resulted in an unstable premix solution that showed turbidity or phase separation when the amount of surfactant was equal to or higher than the amount of polymeric emulsifier (PIBSA):

| Comparative Example | PIB [wt.-%] | PIBSA [wt.-%] | Surfactant Mix [wt.-%] | Solution properties |
|---|---|---|---|---|
| Comp. Ex. 4 | 70 | 5 | 25 | Phase Separation |
| Comp. Ex. 5 | 80 | 5 | 15 | Phase Separation |
| Comp. Ex. 6 | 90 | 5 | 5 | Phase Separation |

Example

Polyisobutene Premix PM11

Polyisobutene (5.0 g, 50 parts per weight, molecular weight 1000 g/mol), polyisobuteneamine (3.25 g, 32.5 parts per weight) and n-paraffin C5-C20 (1.75 g, 17.5 parts per weight) were mixed in a 25 ml glass vial and stirred at low shear with a magnetic stirrer bar. The composition is a homogeneous, clear and stable solution.

Example

Polyisobutene Premix PM12

Polyisobutene (4.0 g, 40 parts per weight, molecular weight 1000 g/mol), polyisobuteneamine (3.9 g, 39.0 parts per weight) and n-paraffin C5-C20 (2.1 g, 21.0 parts per weight) were mixed in a 25 ml glass vial and stirred at low shear with a magnetic stirrer bar. The composition is a homogeneous, clear and stable solution.

Example

Polyisobutene Premix PM13

Polyisobutene (1.0 g, 10 parts per weight, molecular weight 1000 g/mol), polyisobuteneamine (5.85 g, 58.5 parts per weight) and n-paraffin $C_5$-$C_{20}$ (3.15 g, 31.5 parts per weight) were mixed in a 25 ml glass vial and stirred at low shear with a magnetic stirrer bar. The composition is a homogeneous, clear and stable solution.

Example

Polyisobutene Premix PM14

Polyisobutene (24.0 g, molecular weight 1000 g/mol) and polyisobutene succinic anhydride 12.0 g) were mixed in a 25 ml glass vial and stirred at low shear with a magnetic stirrer bar. The mixture is heated to 80° C. to reduce viscosity and thus simplify mixing. A mixture of nonionic surfactant C10-Guerbetalcohol alkoxylate (HLB 12.5) (4.0 g) and water (2.0 g) is added and the mixture is stirred for 30 min, yielding an emulsifiable polyisobutene composition in the form of a homogeneous clear stable solution.

Example

Polyisobutene Premix PM15

Polyisobutene (24.0 g, molecular weight 1000 g/mol) and polyisobutene succinic anhydride (12.0 g) were mixed in a 25 ml glass vial and stirred at low shear with a magnetic stirrer bar. The mixture is heated to 80° C. to reduce viscosity and thus simplify mixing. Nonionic surfactant C10-Guerbetalcohol alkoxylate (HLB 12.5) (4.0 g) is added and the mixture is stirred for 5 min. Subsequently, water (2 g) is added and the mixture is stirred for another 5 min, yielding an emulsifiyable polyisobutene composition in the form of a homogeneous clear stable solution.

Examples of Formulations (F) of Polyisobutylene Premixes in Liquid Detergents

The cleaning and/or treatment compositions of the present invention can be formulated into any suitable form and prepared by any process chosen by the formulator, non-limiting examples of which are described in U.S. Pat. No. 5,879,584; U.S. Pat. No. 5,691,297; U.S. Pat. No. 5,574,005; U.S. Pat. No. 5,569,645; U.S. 5,565,422; U.S. Pat. No. 5,516,448; U.S. Pat. No. 5,489,392; U.S. Pat. No. 5,486,303 all of which are incorporated herein by reference.

Preparation of a Standard Liquid Detergent Formulation (A):

Liquid detergent fabric care compositions of Example A were made by mixing together the ingredients listed in the proportions shown;

| Ingredient (wt %) | A |
| --- | --- |
| $C_{12}$-$C_{15}$ alkyl polyethoxylate (1.8) sulfate[1] | 20.1 |
| $C_{12}$ alkyl trimethyl ammonium chloride[4] | 2.0 |
| $C_{12}$-$C_{14}$ alcohol 9 ethoxylate[3] | 0.8 |
| Monoethanolamine | 2.5 |
| Na cumenesulfonate | 1.8 |
| $C_{12}$-$C_{18}$ Fatty Acid[5] | 1.0 |
| Citric acid[6] | 3.4 |
| Protease[7] (52 g/L) | 0.35 |
| Fluorescent Whitening Agent[8] | 0.08 |
| Diethylenetriamine pentaacetic acid[6] | 0.5 |
| Ethoxylated polyamine[9] | 0.6 |
| Water, perfumes, dyes, buffers, solvents and other optional components | to 100% pH 8.0-8.2 |

[1]Available from Shell Chemicals, Houston, TX.
[2]Available from Sasol Chemicals, Johannesburg, South Africa
[4]Available from Evonik Corporation, Hopewell, VA.
[5]Available from The Procter & Gamble Company, Cincinnati, OH.
[6]Available from Sigma Aldrich chemicals, Milwaukee, WI
[7]Available from Genencor International, South San Francisco, CA.
[8]Available from Ciba Specialty Chemicals, High Point, NC
[9]600 g/mol molecular weight polyethylenimine core with 20 ethoxylate groups per —NH and available from BASF (Ludwigshafen, Germany)

Example F1

Liquid detergent formulation A (97.80 g) was placed in a 150 ml glass beaker and stirred with a mechanical cross-bar stirrer at 325 rpm. Polyisobutene Premix PM1 (2.20 g) was slowly added to the detergent formulation upon stirring. The resulting turbid polyisobutene containing formulation was stirred for another 30 min to form a homogeneous, clear and stable formulation.

Examples F2-F8

The following examples, summarized in Table 1 were prepared in the same way as described in Example F1, applying the polyisobutene premixes and amounts given in the table. The characteristics of the formulation are also described in table 1.

TABLE 1

| Example: | Polyisobutene Premix | Amount of Formulation A [g] | Amount of Premix [g] | Aspect of Formulation |
| --- | --- | --- | --- | --- |
| F1 | PM1 | 97.8 | 2.2 | Clear, homogeneous |
| F2 | PM2 | 97.8 | 2.2 | Clear, homogeneous |
| F3 | PM3 | 97.7 | 2.3 | Clear, homogeneous |
| F4 | PM4 | 97.8 | 2.2 | Clear, homogeneous |
| F5 | PM5 | 97.9 | 2.1 | Clear, homogeneous |
| F6 | PM6 | 97.8 | 2.2 | Clear, homogeneous |
| F7 | PM7 | 97.8 | 2.2 | Clear, homogeneous |
| F8 | PM8 | 97.7 | 2.3 | Clear, homogeneous |
| F9 | PM9 | 97.8 | 2.2 | Clear, homogeneous |
| F10 | PM10 | 97.9 | 2.1 | Clear, homogeneous |
| F12 | PM11 | 98.0 | 2.0 | Slightly turbid, Transmittance = 82% |
| F13 | PM12 | 98.0 | 2.0 | Clear, homogeneous |
| F14 | PM13 | 98.0 | 2.0 | Clear, homogeneous |

Comparative Example CF1

Liquid detergent formulation A (98.0 g) was placed in a 150 ml glass beaker and stirred with a mechanical cross-bar stirrer at 325 rpm. Polyisobutene (2.0 g, molecular weight=1000 g/mol) was slowly added to the detergent formulation upon stirring. The resulting turbid polyisobutene containing formulation was stirred for another 30 min to form a phase-separated turbid mixture with a ring of polyisobutene on top of the liquid level.

Examples of Formulations (F) of Polyisobutylene Premixes in Liquid Fabric Enhancers Preparation of a Standard Liquid Fabric Enhancer Formulation (B)

Rinse-Added fabric care compositions were prepared by mixing together ingredients shown below:

| Ingredient | B |
| --- | --- |
| Fabric Softener Active[1] | 11.0 |
| Lutensol XL-70[2] | 1.0 |
| Quaternized polyacrylamide[4] | 0.25 |
| Calcium chloride[3] | 0.15 |
| Ammonium chloride[3] | 0.1 |
| Alkyl siloxane polymer[6] | 1.5 |
| Perfume | 1.75 |
| Perfume microcapsule[5] | 0.69 |

-continued

| Ingredient | B |
|---|---|
| Water, suds suppressor, stabilizers, pH control agents, buffers, dyes & other optional ingredients | to 100% pH = 3.0 |

[1]N,N-di(tallowoyloxyethyl)-N,N dimethylammonium chloride available from Evonik Corporation, Hopewell, VA.
[2]Available from BASF (Ludwigshafen, Germany)
[3]Available from Sigma Aldrich chemicals, Milwaukee, WI
[4]Cationic polyacrylamide polymer such as a copolymer of acrylamide/[2-(acryloylamino) ethyl]tri-methylammonium chloride (quaternized dimethyl aminoethyl acrylate) available from BASF, AG, Ludwigshafen under the trade name Sedipur ® 544.
[5]Available from Appleton Paper of Appleton, WI
[6]Aminofunctional silicone available from Shin-Etsu Silicones, Akron, OH Example F15

Fabric softener formulation B (98.0 g) was placed in a 100 ml glass beaker and stirred with a mechanical cross-bar stirrer at 325 rpm. Polyisobutene premix PM11 (2.0 g) was slowly added to the fabric softener formulation upon stirring. The resulting polyisobutene containing fabric softener formulation was stirred for another 30 min to form a homogeneous stable formulation that did not show any signs of phase separation.

Example F16

The example is prepared analogous to Example F15, with the difference that the Polyisobutene premix PM11 is colored with a red, oil-soluble and water-insoluble dye (Sudan Red 7B, Sigma-Aldrich, 20 ppm) and the liquid fabric enhancer is colored with a blue, water-soluble and oil-insoluble dye (Liquitint Blue, Milliken, 20 ppm). The resulting polyisobutene containing formulation exhibited a homogeneous, violet color as a result of the perfect emulsification of the water phase and the oil phase, showing not sign of creaming/sedimentation (i.e. no clear blue aqueous phase on top or bottom), as well as not sign of phase separation (i.e. no red oil phase or red oil droplets observable).

Example F17

Fabric softener formulation B (98.0 g) was placed in a 100 ml glass beaker and stirred with a mechanical cross-bar stirrer at 325 rpm. Polyisobutene premix PM13 (2.0 g) was slowly added upon stirring. The resulting polyisobutene containing fabric softener formulation was stirred for another 30 min to form a homogeneous stable formulation that did not show any signs of phase separation.

Example F18

The example was prepared analogous to Example F17, with the difference that the Polyisobutene premix PM5 is colored with a red, oil-soluble and water-insoluble dye (Sudan Red 7B, Sigma-Aldrich, 20 ppm) and the liquid fabric enhancer is colored with a blue, water-soluble and oil-insoluble dye (Liquitint Blue, Milliken, 20 ppm). The resulting polyisobutene containing formulation exhibited a homogeneous, violet color as a result of the perfect emulsification of the water phase and the oil phase, showing not sign of creaming/sedimentation (i.e. no clear blue aqueous phase on top or bottom), as well as not sign of phase separation (i.e. no red oil phase or red oil droplets observable).

Comparative Example CF2

Fabric softener formulation B (98.0 g) that is colored with a blue, water-soluble and oil-insoluble dye (Liquitint Blue, Milliken, 20 ppm) was placed in a 100 ml glass beaker and stirred with a mechanical cross-bar stirrer at 325 rpm. Polyisobutene (2.0 g, 1000 g/mol), colored with a red, oil-soluble and water-insoluble dye (Sudan Red 7B, Sigma-Aldrich, 20 ppm) was slowly added to the fabric softener formulation upon stirring. The resulting polyisobutene containing formulation was stirred for another 30 min to form a clearly phase-separated product consisting of a polyisobutene phase forming a red-colored ring at the top of the liquid level and a liquid fabric enhancer phase forming a blue aqueous phase.

Examples of Formulations (F) of Polyisobutylene Premixes in Hand Dishwash Formulations Standard Liquid Hand Dishwash Formulation The following are non-limiting examples of Liquid Hand Dish Wash formulation compositions prepared by mixing together ingredients shown below.

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Lial AE0.6S | 25.4 | 25.4 | 25.4 | | | | | | |
| AE3S | | | | 12.0 | 28.7 | | | | |
| Lial | | | | | | 31.7 | 39.6 | 44.4 | 52.3 |
| AExS | 13.0 | 13.0 | 13.0 | | | 16.3 | 20.4 | 22.8 | 26.9 |
| AO | 3.2 | 3.2 | 3.2 | 4.0 | 3.3 | 3.8 | 4.7 | 5.3 | 6.3 |
| TMBA | 0.06 | 0.06 | | 0.06 | 0.06 | 0.06 | 0.06 | 0.06 | 0.06 |
| HEDP | 0.1 | 0.1 | | 0.1 | 0.1 | 0.1 | 0.1 | 0.1 | 0.1 |
| Ethanol | 3.0 | 3.0 | 3.0 | 3.0 | 3.0 | 2.5 | 2.5 | 2.5 | 2.5 |
| NaCl | | 1.0 | 1.0 | 1.0 | 1.0 | 1.0 | 1.0 | 1.0 | 1.0 |
| Polypropyleneglyeol | | | | | 0.4 | 0.5 | 0.5 | 0.5 | 0.5 |
| Sodium citrate | | | | | 5 | | | | |
| Water, suds suppressor, stabilizers, pH control agents, buffers, dyes & other optional ingredients | | | | | | To 100% | | | |

Lial AE0.6S—anionic alkyl(ether)0.6sulphate surfactant and amine oxide

AE3S—anionic alkyl(ether)3sulphate surfactant and amine oxide

Lial—commercially available light duty liquid paste from Sasol containing anionic AES surfactant and amphoteric amine oxide AExS—$C_{10}$-$C_{18}$ alkyl alkoxy sulphate surfactants wherein preferably x is from 1-30

AO—total quantity of amine oxides in final product

TMBA is trimethoxy benzole acid

HEDP is 1-hydroxyethylidene 1,1-diphosphonic acid

Example F19

The hand dishwash formulation (50 g) was placed in a 100 ml glass beaker and stirred with a mechanical cross-bar stirrer at 325 rpm. Polyisobutene premix PM1 (1.1 g) was slowly added upon stirring. The resulting polyisobutene containing formulation was stirred for another 30 min to form a slightly turbid, homogeneous liquid.

Example F20

The hand dishwash formulation (50 g) was placed in a 100 ml glass beaker and stirred with a mechanical cross-bar stirrer at 325 rpm. Polyisobutene premix PM2 (1.1 g) was slowly added upon stirring. The resulting polyisobutene containing formulation was stirred for another 30 min to form a turbid, homogeneous liquid.

Example F21

The hand dishwash formulation (50 g) was placed in a 100 ml glass beaker and stirred with a mechanical cross-bar stirrer at 325 rpm. Polyisobutene premix PM13 (1.54 g) was slowly added upon stirring. The resulting polyisobutene containing formulation was stirred for another 30 min to form a clear homogeneous liquid.

Comparative Example CF3

The hand dishwash formulation (50 g) was placed in a 100 ml glass beaker and stirred with a mechanical cross-bar stirrer at 325 rpm. Polyisobutene (molecular weight 1000 g/mol, 1.0 g) was slowly added upon stirring. The resulting polyisobutene containing formulation was stirred for another 30 min to form a turbid, liquid with clearly phase separated droplets of polyisobutene on top of the liquid.

Examples of Formulations (F) of Polyisobutylene Premixes in Cosmetic Formulations

Standard Shampoo and Bodywash Formulation

Cocoamidopropylbetaine (12.5 g, 29.5% active in water) and sodium laureth sulfate (35.7 g, 29% active) were mixed with demineralized water (51.8 g) to form a standard shampoo or bodywash formulation. The product can be thickened with 1.0 g of sodium chloride.

Example F22

The standard shampoo and bodywash formulation (50 g) was placed in a 100 ml glass beaker and stirred with a mechanical cross-bar stirrer at 325 rpm. Polyisobutene premix PM1 (1.1 g) was slowly added upon stirring. The resulting polyisobutene containing formulation was stirred for another 30 min to form a turbid, homogeneous liquid.

Example F23

The standard shampoo and bodywash formulation (50 g) was placed in a 100 ml glass beaker and stirred with a mechanical cross-bar stirrer at 325 rpm. Polyisobutene premix PM2 (1.1 g) was slowly added upon stirring. The resulting polyisobutene containing formulation was stirred for another 30 min to form a turbid, homogeneous liquid.

Example F24

The standard shampoo and bodywash formulation (50 g) was placed in a 100 ml glass beaker and stirred with a mechanical cross-bar stirrer at 325 rpm. Polyisobutene premix PM13 (1.54 g) was slowly added upon stirring. The resulting polyisobutene containing formulation was stirred for another 30 min to form a slightly turbid liquid that shows slight creaming upon storage.

Comparative Example CF4

The standard body wash formulation (50 g) was placed in a 100 ml glass beaker and stirred with a mechanical cross-bar stirrer at 325 rpm. Polyisobutene (molecular weight 1000, 1.0 g) was slowly added upon stirring. The resulting polyisobutene mixture was stirred for another 30 min to form a turbid inhomogeneous liquid that instantaneously shows creaming.

Examples of Formulations (F) of Polyisobutylene Premixes in Car Wash Formulations

Standard Car Wash Shampoo for Home Use

Dodecylbenzenesulfonate amine salt (20 g, 55% active in water), C10-Guerbetalcohol+7EO (HLB 12.5) (2 g, 100% active) and alkylpolyglucoside (2 g, 70% active) were mixed with water (76 g) to form a standard car shampoo formulation for home users.

Example F25

The standard car wash formulation (50 g) was placed in a 100 ml glass beaker and stirred with a mechanical cross-bar stirrer at 325 rpm. Polyisobutene premix PM1 (1.1 g) was slowly added upon stirring. The resulting polyisobutene containing formulation was stirred for another 30 min to form a slightly turbid, homogeneous liquid.

Example F26

The standard car wash formulation (50 g) was placed in a 100 ml glass beaker and stirred with a mechanical cross-bar stirrer at 325 rpm. Polyisobutene premix PM13 (1.54 g) was slowly added upon stirring. The resulting polyisobutene containing formulation was stirred for another 30 min to form an opaque homogenous liquid.

Comparative Example CF5

The standard car wash formulation (50 g) was placed in a 100 ml glass beaker and stirred with a mechanical cross-bar stirrer at 325 rpm. Polyisobutene (molecular weight 1000 g/mol, 1.54 g) was slowly added upon stirring. The resulting polyisobutene containing formulation was stirred for another 30 min to form an inhomogenous, turbid liquid that instantaneously showed creaming and phase separation.

Conductivity Measurememts:

Conductivity is measured at room temperature with a conductometer "LF 320" of "Wissenschaftlich-Technische Werkstätten GmbH". The measurement probe is a TetraCon 325 with a cell constant of 0.466 cm$^{-1}$.

| Sample | Conductivity [µS/cm] |
|---|---|
| Distilled Water (Lab) | 8.0 |
| C10-Guerbetalcohol alkoxylate (HLB 12.5) | 0.4 |
| C13-oxoalcohol + 3 EO (HLB 9) | 0.4 |
| C13-oxoalcohol + 8 EO (HLB 13) | 0.4 |

| Sample | Conductivity [μS/cm] |
|---|---|
| Polyisobutene amine (PIBA) | 0.1 |
| Polyisobutene (PIB, MW 1000) | 0.2 |
| Polyisobutene Succinic Anhydride (PIBSA) | 0.2 |
| Premix PM1 | 0.2 |
| Premix PM2 | 0.2 |
| Premix PM5 | 0.2 |
| Premix PM5 + 5% Water | 0.2 |
| Premix PM5 + 10% Water | 0.2 |

As can be seen from the measurements, all premixes display the same conductivity as the hydrophobic components such as PIB or PIBA, showing that water is not the continuous phase in these premixes.

The invention claimed is:

1. Self-emulsifiable composition comprising
   a) polyolefins in an amount of from 5 to 90 weight %,
   b) polymeric emulsifier(s) $P_x$ in an amount of from 5 to 90 weight %,
   c) oil(s) Q in an amount of from 0 to 40 weight %,
   d) surfactant(s) $S_X$ in an amount of from 0 to 40 weight %,
   e) additive(s) $A_x$ in an amount of from 0 to 10 weight %,
   f) water in an amount of from 0 to 8 weight %,
   based on the total weight of the composition,
   wherein water is not the continuous phase of the composition,
   wherein the weight ratio of polyolefin(s) to $P_x$ and $S_x$ is in the range of from 4:1 to 1:3 and the weight ratio of $P_x$ to $S_x$ is higher than 1.25.

2. Self-emulsifiable composition according to claim 1, wherein the components independently of each other are present in amounts of:
   a) polyolefin(s) in an amount of from 20 to 70 weight %,
   b) polymer emulsifier(s) $P_x$ in an amount of from 10 to 50 weight %,
   c) oil(s) $O_x$ in an amount of from 0 to 40 weight %,
   d) surfactant(s) $S_x$ in an amount of from 0.1 to 30 weight %,
   e) additive(s) $A_x$ in an amount of from 0 to 10 weight %,
   f) water in an amount of from 0 to 8 weight %,
   based on the total weight of the composition,
   wherein water is not the continuous phase of the composition,
   wherein the weight ratio of polyolefin(s) to $P_x$ and $S_x$ is in the range of from 4:1 to 1:3 and the weight ratio of $P_x$ to S, is higher than 1.25.

3. Self-emulsifiable composition according to claim 1, wherein the components independently of each other are present in amounts of:
   a) polyolefin(s) in an amount of from 30 to 60 weight %,
   b) polymer emulsifier(s) $P_x$ in an amount of from 20 to 45 weight %,
   c) oil(s) $O_x$ in an amount of from 0.1 to 30 weight %,
   d) surfactant(s) $S_x$ in an amount of from 0.5 to 25 weight %,
   e) additive(s) $A_x$ in an amount of from 0.1 to 10 weight %,
   f) water in an amount of from 0 to 8 weight %,
   based on the total weight of the composition,
   wherein water is not the continuous phase of the composition,
   wherein the weight ratio of polyolefin(s) to $P_x$ and $S_x$ is in the range from 4:1 to 1:3 and the weight ratio of $P_X$ to $S_x$ is higher than 1.25.

4. Self-emulsifiable composition according to claim 1, wherein the components independently of each other are present in amounts of:
   a) polyolefin(s) in an amount of from 40 to 50 weight %,
   b) polymeric emulsifier(s) P, in an amount of from 25 to 40 weight %,
   c) oil(s) $O_x$ in an amount of from 5 to 15 weight %,
   d) surfactant(s) $S_x$ in an amount of from 5 to 15 weight %,
   e) additive(s) $A_x$ in an amount of from 2 to 8 weight %,
   f) water in an amount of from 0 to 8 weight %,
   based on the total weight of the composition
   wherein water is not the continuous phase of the composition,
   wherein the weight ratio of polyolefin(s) to $P_x$ and $S_x$ is in the range from 4:1 to 1:3 and the weight ratio of $P_x$ to S, is higher than 1.25.

5. Self-emulsifiable composition according to claim 1, wherein the composition is a water-free composition.

6. Self-emulsifiable composition according to claim 1, wherein the composition is a water-reduced composition.

7. Self-emulsifiable composition according to claim 1, wherein the polyolefin(s) is/are selected from the group consisting of: polyethylene, polypropylene, polybutylene, polyisobutene, and mixtures thereof.

8. Self-emulsifiable composition according to claim 1, wherein the polymeric emulsifier(s) $P_X$ is/are selected from the group consisting of
   P1) polyisobutene derivatives, wherein P1 is polyisobutenamine, polyisobutene succinic anhydride, a copolymer of polyisobutene succinic anhydride with polyalkylene glycol, a copolymer of polyisobutene succinic anhydride with an oligoamine or with an oligoamine alkoxylate,
   P2) polymeric cationic emulsifiers, wherein P2 is the result of the polymerization of
      $A_2$) one or more cationic ethylenically unsaturated monomers
      $B_2$) one or more linear or branched alkyl(meth)acrylates,
      $C_2$) from 0 to 30 weight % of one or more $C_3$-$C_8$ monoethylenically unsaturated carboxylic acids,
   P3) being copolymers of polyalkylene(s) of formula 3

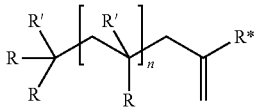

(3)

wherein:
$R^* = H, CH_3$,
R=H, methyl,
R'=H, methyl,
n=1 to 200,
with monoethylenically unsaturated monomers.

9. Self-emulsifiable composition according to claim 1, wherein the polymer(s) $P_X$ is/are selected from the group consisting of
   P1) polyisobutene derivatives, wherein P1 is polyisobutenamine, polyisobutene succinic anhydride, a copolymer of polyisobutene succinic anhydride and polyethylene glycol,
   P2) polymeric cationic emulsifiers, wherein P2 is the result of the polymerization of
      A2) diallyl dimethyl ammonium chloride,
      B2) one or more linear or branched alkyl(meth)acrylates,
      C2) from 0 to 30 weight % of acrylic acid, and P3) being copolymers of polyalkylene(s) of formula 3

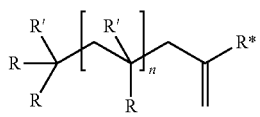

wherein:
R*=H, CH$_3$,
R=H, methyl,
R'=H, methyl,
n=1 to 200,
with monoethylenically unsaturated monomers.

10. Self-emulsifiable composition according to claim 1, wherein the oil(s) O$_x$ is/are selected from the group consisting of:
  c1) mineral oils, having a boiling point at atmospheric pressure of 150° C. or higher
  c2) esters of C$_{10}$- to C$_{26}$-carboxylic acid with C$_8$-C$_{24}$-alcohols and
  c3) silicone oils.

11. Self-emulsifiable composition according to claim 1, wherein the surfactant(s) S$_x$ is/are selected from the group consisting of:
  d1) nonionic surfactants,
  d2) anionic surfactants and
  d3) cationic surfactants.

12. Self-emulsifiable composition according to claim 1, which has a content of organic solvent below 50 mg/kg of composition.

13. A composition comprising an emulsion according to claim 1, wherein the composition is utilized in chemical technical applications, cosmetics, plant protection, preparation and treatment of paper, textiles and leather, adhesives, dye and pigment formulations, coatings, pharmaceutical applications, construction, wood treatment.

14. A composition comprising an emulsion according to claim 1, wherein the composition is utilized in car wash, laundry detergent compositions, hard surface cleaners, automatic dishwashing liquids and dishwashing liquids.

\* \* \* \* \*